(12) United States Patent
Walker et al.

(10) Patent No.: US 11,379,650 B2
(45) Date of Patent: *Jul. 5, 2022

(54) SYSTEMS AND METHODS FOR GESTURE-BASED FORMATTING

(71) Applicant: WETRANSFER B.V., Amsterdam (NL)

(72) Inventors: Julian Walker, New York, NY (US); Ian Curry, Brooklyn, NY (US)

(73) Assignee: WETRANSFER B.V., Amsterdam (NL)

( * ) Notice: Subject to any disclaimer, the term of this patent is extended or adjusted under 35 U.S.C. 154(b) by 52 days.

This patent is subject to a terminal disclaimer.

(21) Appl. No.: 16/693,073

(22) Filed: Nov. 22, 2019

(65) Prior Publication Data
US 2020/0175221 A1    Jun. 4, 2020

Related U.S. Application Data

(63) Continuation of application No. 14/997,022, filed on Jan. 15, 2016, now Pat. No. 10,521,493, which is a
(Continued)

(51) Int. Cl.
*G06F 40/103* (2020.01)
*G06F 3/04883* (2022.01)
(Continued)

(52) U.S. Cl.
CPC .......... *G06F 40/103* (2020.01); *G06F 3/0482* (2013.01); *G06F 3/0488* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 5,583,542 | A | 12/1996 | Capps et al. |
| 5,881,169 | A | 3/1999 | Henry, Jr. |

(Continued)

OTHER PUBLICATIONS

"GNU Image Manipulation Program Manual", https://docs.gimp.org/2.10/en/gimp-font-dialog.html, Sep. 25, 2004, 2 pages.
(Continued)

*Primary Examiner* — William L Bashore
*Assistant Examiner* — Nathan K Shrewsbury
(74) *Attorney, Agent, or Firm* — Stoel Rives LLP

(57) ABSTRACT

The present disclosure provides systems and methods displaying and formatting text on an electronic display. A gesture input may be received via a gesture input device associated with the electronic display. For instance, a touchscreen may receive a touch gesture input. Each of a plurality of gesture inputs may be associated with a formatting rule and/or a text-component for selecting a portion of displayed text. Selected text may be formatted according to the formatting rule associated with the received gesture input. The formatted text may be displayed on the electronic display. A data store may associate each of the plurality of gesture inputs with a formatting rule that can be applied to selected text. Alternatively, a data store may associate each of the plurality of gesture inputs with a formatting rule and a text-component that defines to which component of text the formatting rule should be applied.

19 Claims, 26 Drawing Sheets

Related U.S. Application Data continuation of application No. 14/820,392, filed on Aug. 6, 2015, now Pat. No. 9,965,445.

(51) Int. Cl.
*G06F 3/0482* (2013.01)
*G06F 3/0488* (2022.01)

(56) References Cited

U.S. PATENT DOCUMENTS

| | | | |
|---|---|---|---|
| 7,158,123 B2 | 1/2007 | Myers et al. | |
| 7,305,630 B2 | 12/2007 | Hullender et al. | |
| 7,526,737 B2 | 4/2009 | Simmons et al. | |
| 7,659,890 B2 | 2/2010 | Simmons | |
| 8,593,418 B2 | 11/2013 | Blow et al. | |
| 9,239,673 B2 | 1/2016 | Shaffer et al. | |
| 9,239,820 B1* | 1/2016 | Marks | G06F 40/106 |
| 9,652,141 B2 | 5/2017 | Mak | |
| 9,965,445 B2* | 5/2018 | Walker | G06F 40/103 |
| 10,521,493 B2* | 12/2019 | Walker | G06F 3/04883 |
| 2004/0060000 A1 | 3/2004 | Jaeger | |
| 2005/0229117 A1 | 10/2005 | Hullender et al. | |
| 2007/0152981 A1 | 7/2007 | Im | |
| 2007/0270985 A1 | 11/2007 | Shellshear | |
| 2008/0036743 A1 | 2/2008 | Westerman et al. | |
| 2008/0089587 A1* | 4/2008 | Kim | G06F 3/0304 |
| | | | 382/190 |
| 2008/0122796 A1 | 5/2008 | Jobs et al. | |
| 2009/0199241 A1 | 8/2009 | Unger et al. | |
| 2009/0228792 A1 | 9/2009 | Van Os et al. | |
| 2010/0077355 A1 | 3/2010 | Belinksky et al. | |
| 2010/0107062 A1 | 4/2010 | Bacus et al. | |
| 2010/0259482 A1 | 10/2010 | Ball | |
| 2011/0179376 A1 | 7/2011 | Berestov et al. | |
| 2011/0185300 A1* | 7/2011 | Hinckley | G06F 3/03545 |
| | | | 715/769 |
| 2011/0225492 A1 | 9/2011 | Boettcher et al. | |
| 2012/0030566 A1 | 2/2012 | Victor | |
| 2012/0084644 A1 | 4/2012 | Robert et al. | |
| 2012/0235938 A1 | 9/2012 | Laubach | |
| 2012/0272181 A1 | 10/2012 | Rogers et al. | |
| 2012/0306748 A1* | 12/2012 | Fleizach | G06F 3/033 |
| | | | 345/161 |
| 2012/0311507 A1 | 12/2012 | Murrett et al. | |
| 2013/0007061 A1 | 1/2013 | Luomala | |
| 2013/0019175 A1* | 1/2013 | Kotler | G06F 3/0482 |
| | | | 715/728 |
| 2013/0036382 A1 | 2/2013 | Yuan et al. | |
| 2013/0241847 A1 | 9/2013 | Shaffer | |
| 2013/0285930 A1 | 10/2013 | Thorsander et al. | |
| 2013/0321283 A1 | 12/2013 | Mak | |
| 2014/0013258 A1* | 1/2014 | Jang | G06F 9/451 |
| | | | 715/769 |
| 2014/0282178 A1 | 9/2014 | Borzello et al. | |
| 2014/0298171 A1* | 10/2014 | Wang | G16Z 99/00 |
| | | | 715/716 |
| 2014/0333632 A1 | 11/2014 | Kim | |
| 2014/0380248 A1 | 12/2014 | Pangasa | |
| 2015/0121285 A1* | 4/2015 | Eleftheriou | G06F 3/04842 |
| | | | 715/773 |
| 2015/0138155 A1 | 5/2015 | Bernstein et al. | |
| 2015/0149899 A1 | 5/2015 | Bernstein et al. | |
| 2015/0277744 A1 | 10/2015 | Tan | |
| 2015/0363001 A1 | 12/2015 | Malzbender | |
| 2016/0378291 A1 | 12/2016 | Pokrzywka | |
| 2017/0038959 A1* | 2/2017 | Walker | G06F 3/0488 |
| 2017/0039167 A1 | 2/2017 | Walker et al. | |
| 2020/0175221 A1* | 6/2020 | Walker | G06F 40/103 |

OTHER PUBLICATIONS

U.S. Appl. No. 14/820,392, Notice of Allowance, dated Feb. 12, 2018, 9 pages.
U.S. Appl. No. 14/820,392, Non-Final Office Action, dated Sep. 26, 2017, 29 pages.
U.S. Appl. No. 14/997,022, Non-final Office Action, dated Aug. 30, 2018, 33 pages.
U.S. Appl. No. 14/997,022, Final Office Action, dated May 16, 2019, 32 pages.

* cited by examiner

| | | | Cambria | | | | |
| --- | --- | --- | --- | --- | --- | --- | --- |
| | | | Cooper Black | | | | |
| | | | Georgia | | | | |
| <u>Style 3</u><br>●Style 3<br>•Style 3 | Style 2<br>☐Style 2<br>━Style 2 | Style 1<br>☐Style 1<br>☐Style 1 | Default | ● | ☐ | • | ━ |
| | | | Arial Black | | | | |
| | | | Century Gothic | | | | |
| | | | Tahoma | | | | |
| | | | Verdana | | | | |

FIG. 16B

SYSTEMS AND METHODS FOR GESTURE-BASED FORMATTING

CROSS-REFERENCE TO RELATED APPLICATIONS

This application is a continuation of U.S. patent application Ser. No. 14/997,022, filed Jan. 1, 2016, entitled SYSTEMS AND METHODS FOR GESTURE-BASED FORMATTING, which is a continuation of U.S. patent application Ser. No. 14/820,392, filed Aug. 6, 2015, entitled SYSTEMS AND METHODS FOR GESTURE-BASED FORMATTING, the disclosure of both of which are incorporated herein by reference in their entirety.

TECHNICAL FIELD

The present disclosure relates generally to the field of textual formatting on touchscreen devices. More specifically, the present disclosure relates to formatting text based on gesture inputs performed using one or more fingers, such as multi-touch gesture inputs.

BRIEF DESCRIPTION OF THE DRAWINGS

Non-limiting and non-exhaustive embodiments of the disclosure are described herein, including various embodiments of the disclosure illustrated in the figures listed below.

FIG. 10A illustrates a user rearranging the order of paragraphs of text using a hold and drag gesture input on a paragraph displayed on a touchscreen device.

FIG. 10B illustrates two paragraphs rearranged based on the hold and drag gesture input.

FIG. 16A illustrates formatting options along sequentially selectable horizontal and vertical continuums, according to various embodiments.

FIG. 16B illustrates formatting options along sequentially selectable horizontal and vertical continuums, according to an alternative embodiment.

DETAILED DESCRIPTION

Figure 1B:
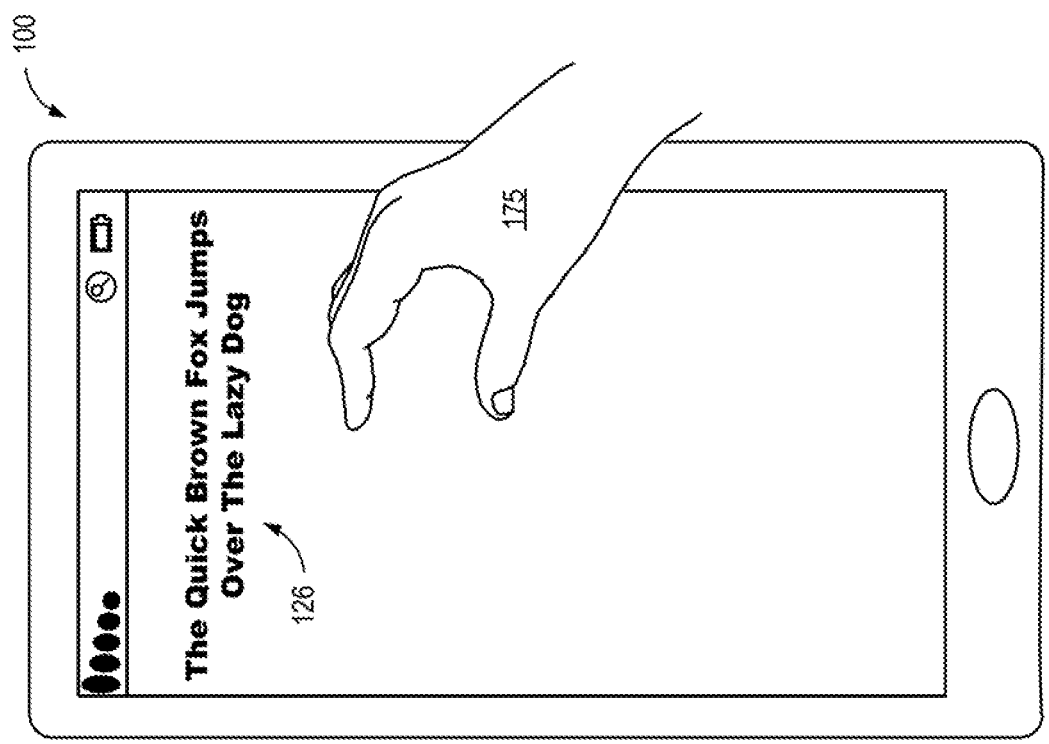
FIG. 1B illustrates the bold formatting applied to the selected text in response to the two-finger pinch/spread gesture input.

According to various embodiments of the presently described systems and methods, gesture inputs, provided, for example, via a touchscreen of an electronic device, may be used to selectively apply formatting to text displayable on a display of the electronic device. Each of a plurality of formatting rules may be associated with a unique formatting rule, thereby allowing an operator to perform one or more gesture inputs to quickly, and potentially with a reduced number of inputs, apply one or more formatting rules to a portion of text displayed or displayable on an electronic device.

Many electronic devices include electronic displays associated with touch-sensitive or other gesture-recognizing input devices. For example, smartphones, tablets, computer monitors, laptops, and various other electronic devices include touchscreen display input devices. Other gesture input devices, such as trackpads, finger/stylus position recognition devices (e.g., optical, ultrasonic, RF, etc.), and/or other input devices, may be associated with electronic displays (touchscreen or otherwise) capable of displaying and formatting text.

For example, a laptop may include an electronic display that may or may not include a touch-sensitive digitizer and a touch-sensitive trackpad. As another example, a portable electronic device, such as a tablet or cellular phone, may include a touch input device that incorporates one or more of an active digitizer, a resistive digitizer, a capacitive digitizer, a pressure-sensitive digitizer, an acoustic digitizer, and an infrared digitizer.

Regardless of how a gesture input is electronically detected by the electronic device, a gesture input is associated with at least one formatting rule. The formatting rule may be selectively applied to text or other objects displayed or displayable on the electronic device. An operator of the electronic device may provide the selection of text to which the formatting rule associated with a received gesture input is to be applied. In some embodiments, the selection of the text to which the formatting rule is to be applied is provided before the gesture input is provided. In other embodiments, the order of receiving the gesture input and the text selection can be reversed.

In some embodiments, a gesture input is associated with at least one formatting rule and a text-component that identifies or selects a component of text to which the formatting rule is to be applied. The text-component associated with a gesture input may be explicitly defined or may be contextually determined. For example, a text selection for a specific gesture input may be defined as a text-component underlying the received gesture input or proximate (e.g., before, after, below, above, etc.) a cursor location. Thus, the size or footprint of a received gesture input may be contextually used to select a phrase (a relatively small gesture input) or a paragraph (a relatively large gesture input) for the application of an associated formatting rule.

As another example, a formatting gesture associated with indentations might be contextually interpreted as being associated with a paragraph of text or text between two page or section breaks. Similarly, a formatting gesture associated with a bullet point or numbered list might be contextually interpreted as being associated with a sentence, paragraph, or a carriage return.

In some embodiments, the text-component associated with a gesture input may be explicitly defined as one of a phrase selection, a clause selection, a sentence selection, a paragraph selection, a bulleted list item selection, a numbered list item selection, or an ordered list item selection.

Various components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments.

Many mobile devices and touchscreen devices have limited space available for controls. Many of these devices incorporate control features that are implemented using a primary display manipulated by touch, and a group of secondary on-screen controls and/or menus that may be used when called upon by a user of a touchscreen device. The on-screen controls may include a keyboard or a group of buttons (whether physical or virtual) that take up a portion of the display and/or device. Additionally, in many cases it is difficult for the user of the touchscreen device to use more than one hand to operate the device. For example, the user may use one hand to hold the touchscreen device and the other hand to operate the device. Formatting text on a mobile or touchscreen device is often difficult and/or time-consuming and may require accessing menus, submenus, multiple clicks, option selections, scrolling, and/or other cumbersome manipulation sequences to select a desired formatting.

As previously described, a plurality of gesture inputs may be recognizable by software, hardware, and/or firmware that associates specific gesture inputs as being associated with formatting rules on the electronic device and/or a software application executable by the electronic device (e.g., text and/or document editing software). In some embodiments, the user may be able to select text using the operating system's selection cursor or other means. The user may then perform a gesture input using one or more fingers by, for example, touching the screen of the device with the one or more fingers and manipulating the one or more fingers in a predefined manner. Software, hardware, and/or firmware associated with the electronic device may recognize or interpret the gesture input to apply the associated formatting to the selected text.

In other embodiments, the system may format text without the need for the user to explicitly select text using the selection cursor of the operating system and/or text editing application. For example, a software solution or other system incorporating the gesture-based formatting embodiments described herein may be configured to detect where one paragraph ends and another paragraph begins and/or otherwise distinguish between different phrases, sentence clauses, sentences, paragraphs, bulleted list items, numbered list items, and/or other ordered list items.

A gesture input may be performed to indicate a specific formatting for the contextually recognized text selection. For example, the system may detect the target paragraph, indicated by the gesture input, and apply the specified formatting. In some embodiments, the gesture inputs used to indicate formatting may be predefined by the system. In other embodiments, the system may allow a user to define custom gesture inputs for different types of textual formatting. By using gesture inputs instead of on-screen controls, menus, and sub-menus users may be able to format text with significantly enhanced speed.

The phrases "connected to" and "in communication with" include any form of communication between two or more components, including mechanical, electrical, magnetic, and electromagnetic interaction. Two components may be connected to or in communication with each other, even though they may not be in direct contact with each other, and/or even though there may be intermediary devices between the two components.

As used herein, the term "electronic device" may refer to any of a wide variety of wireless or wired electronic devices capable of data communication, including sensors, controllers, monitors, communication devices, personal electronic devices, computers, laptops, tablets, personal computers, network devices, routers, hubs, switches, network node devices, network host devices, control devices, and the like.

Some of the infrastructure that can be used with embodiments disclosed herein is already available, such as: general-purpose computers, computer programming tools and techniques, digital storage media, and communications networks. An electronic device may include a processing unit, such as a microprocessor, microcontroller, logic circuitry, or the like. The processing unit may include a special-purpose processing device, such as an ASIC, PAL, PLA, PLD, FPGA, or other customized or programmable device. Accordingly, as used herein the term "processor" should be broadly understood to include any of a wide variety of hardware, firmware, and/or software combinations capable of executing instructions, whether encoded in hardware or software.

An electronic device may also include and/or be associated with (e.g., remote access) any of a wide variety of computer-readable storage devices for usage as data stores, such as non-volatile memory, static RAM, dynamic RAM, ROM, CD-ROM, disk, tape, magnetic memory, optical memory, flash memory, or other computer-readable storage medium.

Aspects of certain embodiments described herein may be implemented as software modules or components. As used herein, a software module or component may include any type of computer instruction or computer executable code located within or on a computer-readable storage medium located locally or remotely. A software module may, for instance, comprise one or more physical or logical blocks of computer instructions, which may be organized as a routine, program, object, component, data structure, etc., that performs one or more tasks or implements particular abstract data types. Similarly, hardware modules may include any of a wide variety of electrical, mechanical, and/or biological components. Thus, a module in general may refer to any combination of software, hardware, and/or firmware components configured to function a particular way. Any of a wide variety of programming languages and/or hardware architectures may be utilized in conjunction with the various embodiments described herein.

In some cases, well-known features, structures, or operations are not shown or described in detail. Furthermore, the described features, structures, or operations may be combined in any suitable manner in one or more embodiments. It is also understood that the components of the embodiments, as generally described and illustrated in the figures herein, could be arranged and designed in a wide variety of different configurations. In addition, the steps of a method do not necessarily need to be executed in any specific order, or even sequentially, nor need the steps be executed only once, unless explicitly specified or infeasible otherwise.

The embodiments of the disclosure may be understood by reference to the drawings, wherein like parts are designated by like numerals throughout. The components of the disclosed embodiments, as generally described and illustrated in the figures herein, could be arranged and designed in a wide variety of different configurations. Any of the various embodiments described herein may be combined in whole or in part with any other embodiment described herein.

Figure 1A:
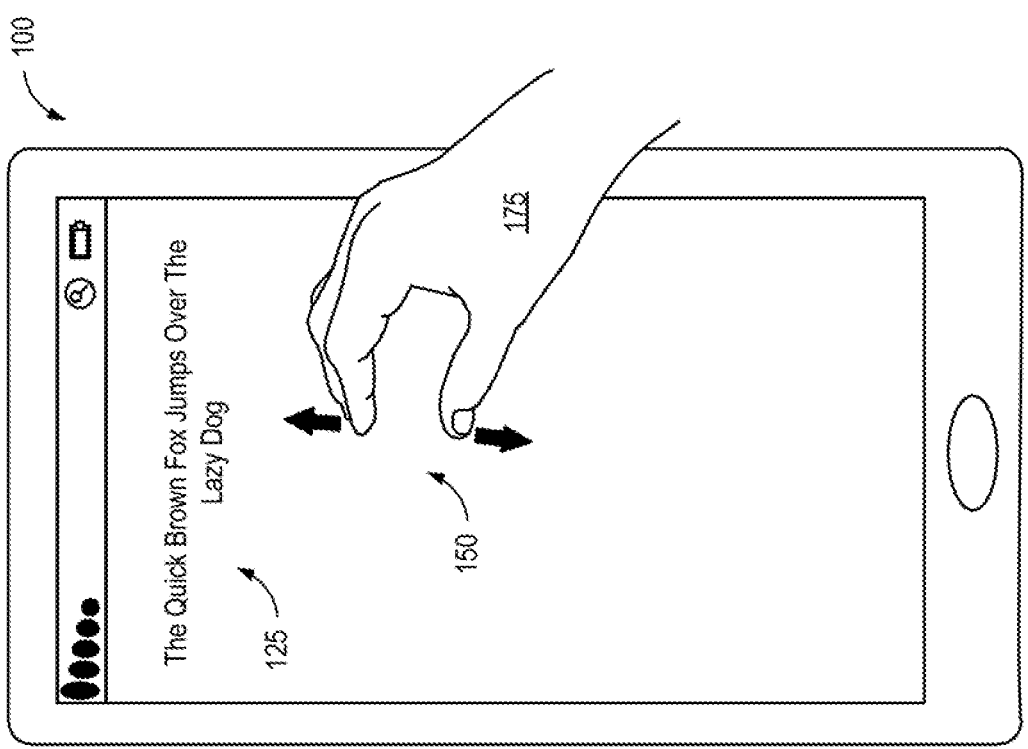
FIG. 1A illustrates a user performing a two-finger pinch/spread gesture input on a touchscreen device to apply a bold formatting to selected text.

FIG. 1A illustrates a user 175 performing a two-finger pinch/spread gesture input 150 on a touchscreen device 100 to apply a bold formatting 126 to the selected text. The text 125 may have been explicitly selected previously, contextually selected based on the lack of any other text on the screen, contextually selected based on the text 125 being the most recently edited text, contextually selected based on a default selection of "all displayed text" in the absence of any other explicit selection, and/or otherwise selected.

FIG. 1B illustrates the bold formatting 126 applied to the selected text 125 in response to the two-finger pinch/spread gesture input 150. A touchscreen device 100 is depicted with displayed on-screen text.

In FIG. 1A, the user (i.e., operator) 175 begins the gesture input 150 with an on-screen pinch using the thumb and forefinger. To complete the gesture input 150, the thumb and forefinger fan outward, as indicated by the arrows. Once the gesture input 150 is completed, the system (e.g., software, hardware, or firmware) interprets the gesture input 150 and correlates or otherwise associates it to a specific text formatting rule. In the illustrated embodiments, the pinch/spread gesture 150 is associated with the bold formatting 126. The bold formatting 126 is applied to the selected text 125, as shown in FIG. 1B.

In each of FIGS. 1A-12D, a gesture input is shown being received by a touchscreen digitizer of the electronic device. Thus, each of the gestures is illustrated on a touchscreen device. However, each of the illustrated embodiments could be modified or adapted for use with an alternative system. As previously described, a gesture input may comprise a movement of one or more fingers or hands that is detected by the electronic device in any manner. For instance, gestures to those illustrated in FIGS. 1A-12D could be detected by an electronic device using optical recognition, radio frequency recognition, and/or acoustical recognition. Relatedly, in embodiments in which a touch input device is utilized, the touch input device may rely on technologies related to resistive digitizers, capacitive digitizers, pressure-sensitive digitizers, acoustic digitizers, and/or infrared digitizers.

In each of the illustrated embodiments, a finger, multiple fingers, and/or a hand of a user/operator is shown as performing the gesture. It is appreciated that other body parts may be used to provide gesture inputs that are recognizable by the electronic device, whether optically, acoustically, capacitively, resistively, or otherwise. Additionally, a stylus (active or passive) or other input instrument may be utilized in lieu of or in addition to the fingers or other body parts of a user.

Moreover, in each of the illustrated embodiments of FIGS. 1A-12D, a gesture input is illustrated as being associated with a single, specific formatting rule. In alternative embodiments, a single gesture input may be associated with more than one formatting rule. As one example, a single gesture input comprising a pinch/spread while sliding from left to right may be associated with a bold format rule and an underlining format rule. As another example, a single gesture input that is normally associated with adding a bullet point may be exaggerated to also apply a bold formatting and/or performed at an angle/diagonal to also apply an italics formatting. The force of a touch input could also be used as a factor to, for example, apply bold formatting during text entry and/or concurrently with a gesture input associated with another formatting rule.

Finally, in each of the illustrated embodiments of FIGS. 1A-12D, the formatting rule is illustrated as being applied to selected text without a specific illustration of how the specific text is selected. Accordingly, it should be understood that the text selection may be explicitly made using other text selection tools external to the gesture-based formatting solution (e.g., via cursor selection) or the text selection may be made contextually. Alternatively, text selection may be made based on a defined text-component (e.g., sentence, paragraph, clause, etc.) associated with the gesture input.

Figure 2B:
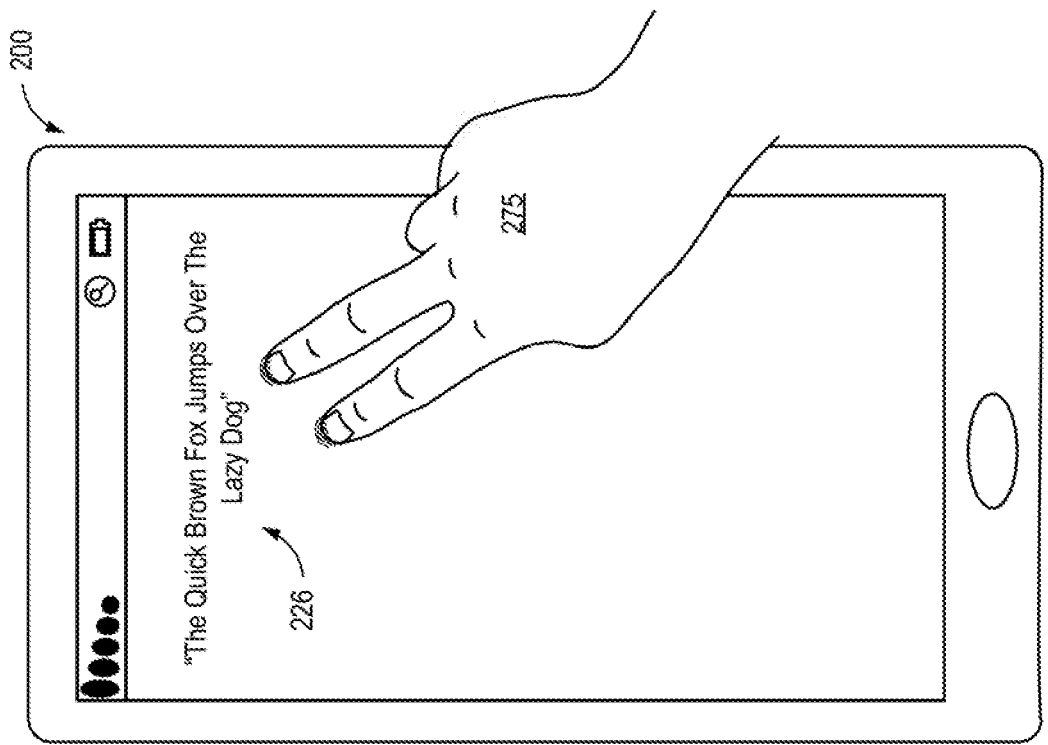
FIG. 2B illustrates the quotation mark formatting applied to the selected text in response to the two-finger tap gesture input.
Figure 2A:
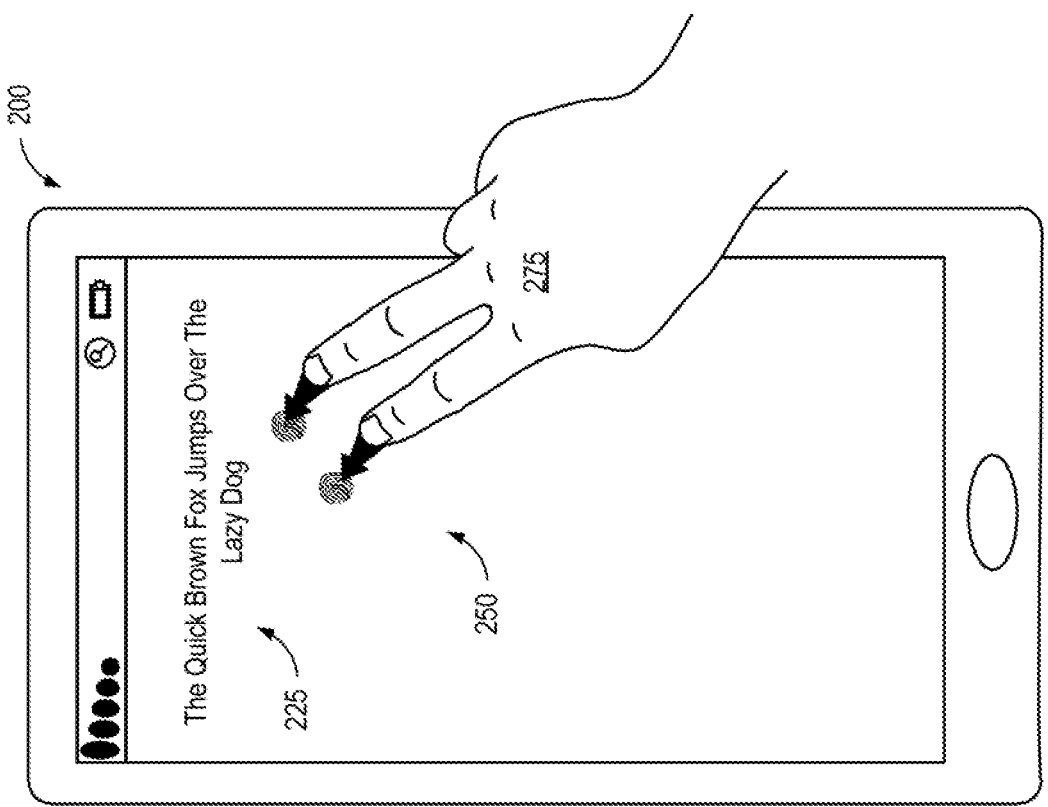
FIG. 2A illustrates a user performing a two-finger tap gesture input on a touchscreen device to add quotation mark formatting around selected text.

FIG. 2A illustrates a user 275 performing a two-finger tap gesture input 250 on a touchscreen device 200 to add quotation mark formatting around selected text 225. In various embodiments, a gesture input (such as gesture input 250) involving explicitly selected text or the only text currently displayed does not necessarily require the gesture input to be performed proximate to (i.e., at or near) the location of the displayed text.

That is, in various embodiments, gesture inputs that involve explicitly selected text may be performed at any location on the screen of the touchscreen device. In other embodiments, the on-screen location of the gesture input may be important and the system may correlate a gesture input to specific text formatting based on the on-screen location of the gesture input.

FIG. 2B illustrates the quotation mark formatting 226 applied to the selected text in response to the two-finger tap gesture input 250.

Figure 3B:
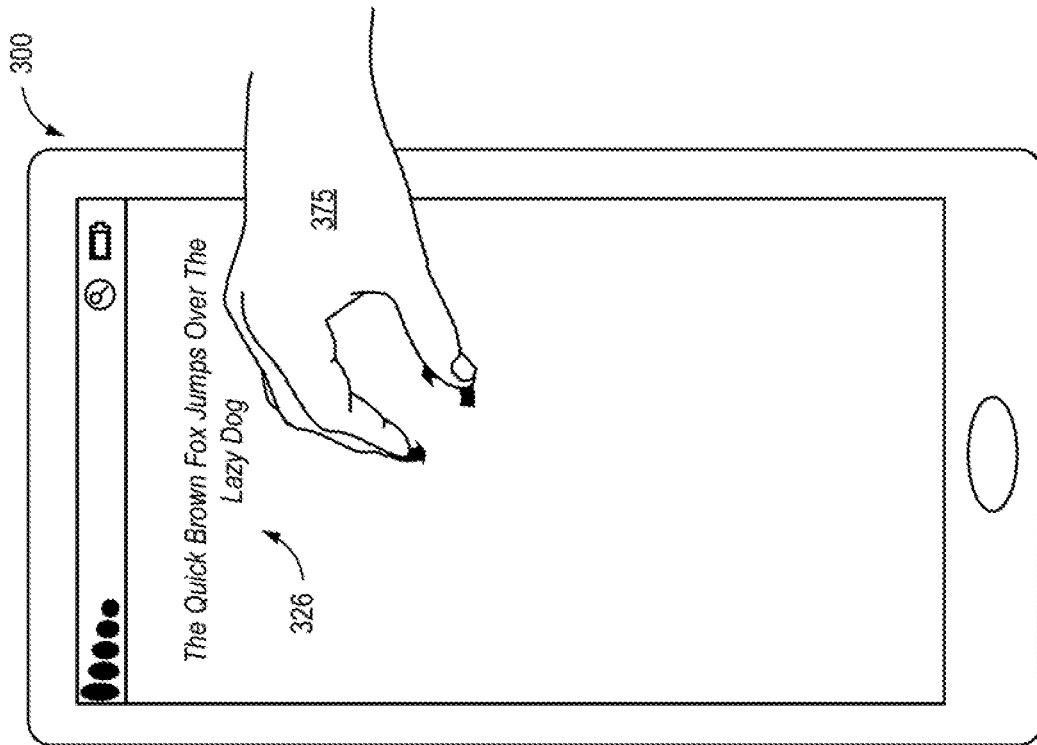
FIG. 3B illustrates the italics formatting applied to the selected text in response to the two-finger twist gesture input.
Figure 3A:
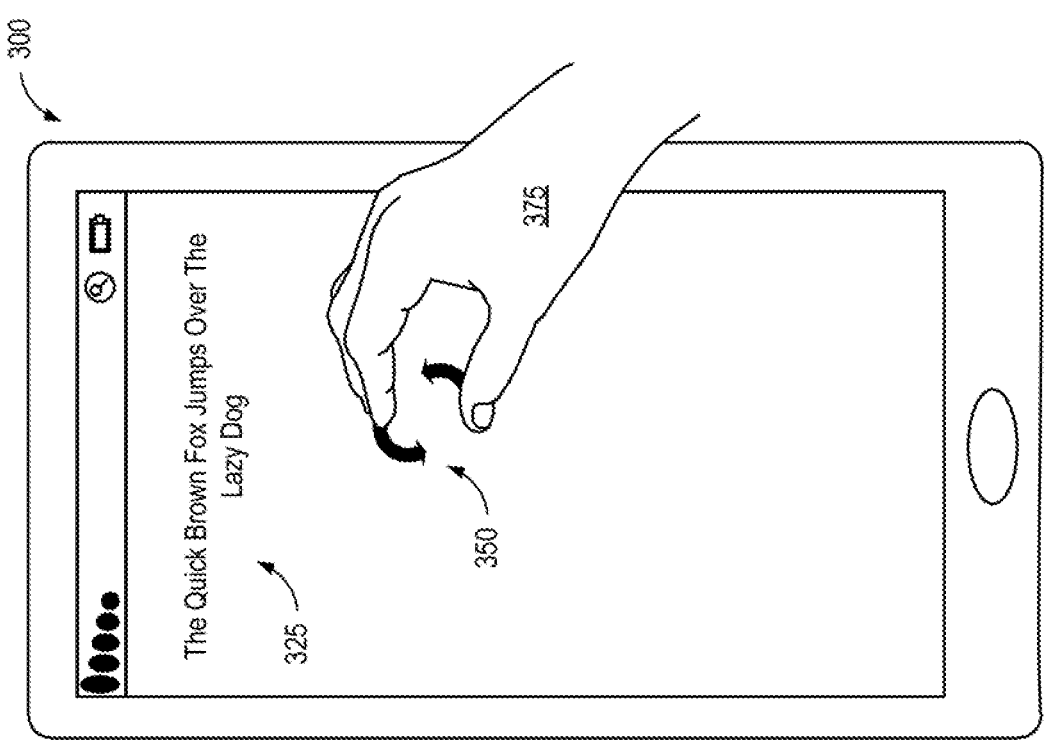
FIG. 3A illustrates a user performing a two-finger twist gesture input on a touchscreen device to apply an italics formatting to selected text.

FIG. 3A illustrates a user 375 performing a two-finger twist gesture input 350 on a touchscreen device 300 to apply an italics formatting 326 to selected text 325. FIG. 3B illustrates the italics formatting 326 applied to the selected text 325 in response to the two-finger twist gesture input 350. The two-finger twist gesture input 350 may be completed by placing two fingers onto the screen and twisting them in a counter-clockwise (or alternatively clockwise) manner, as shown in FIG. 3A. As a specific example, the user 375 is depicted as using the thumb and forefinger to perform the gesture input 350.

Many of gesture inputs described herein may be performed using any combination of fingers (e.g., thumb and forefinger, forefinger and middle finger, etc.). For various gesture inputs, it is the placement and/or motion of the fingers or other input device(s) that defines the gesture input.

Figure 4B:
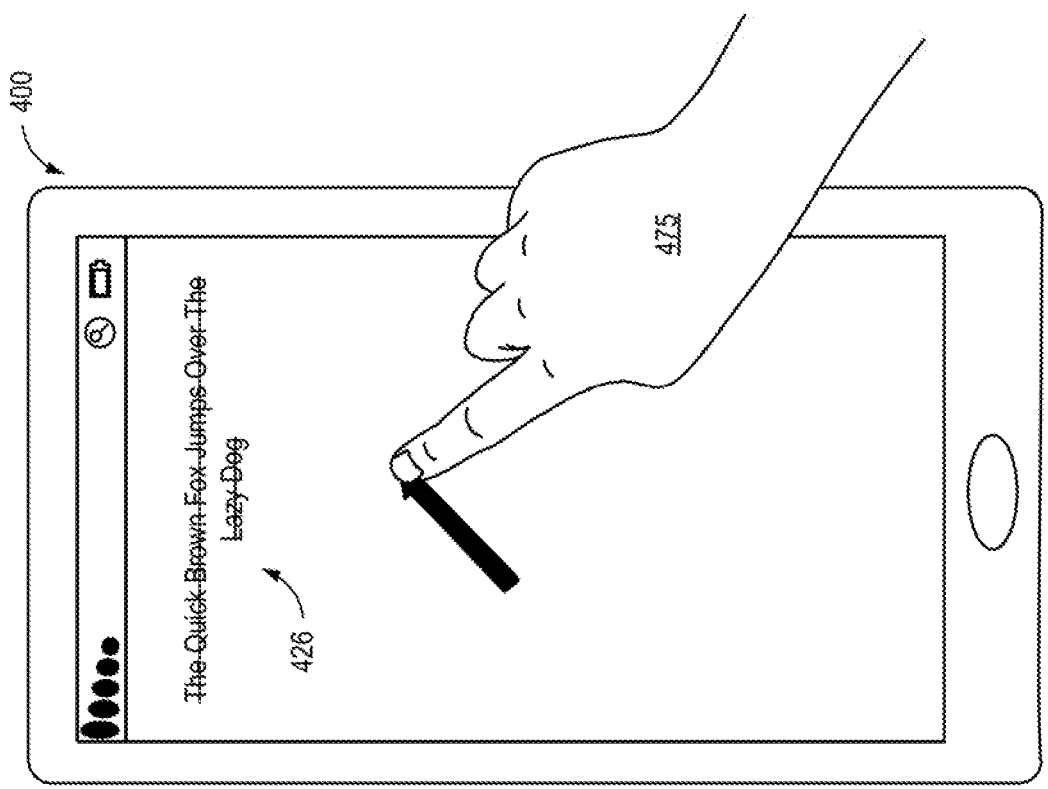
FIG. 4B illustrates the strikethrough formatting applied to the selected text in response to the one-finger diagonal swipe gesture input.
Figure 4A:
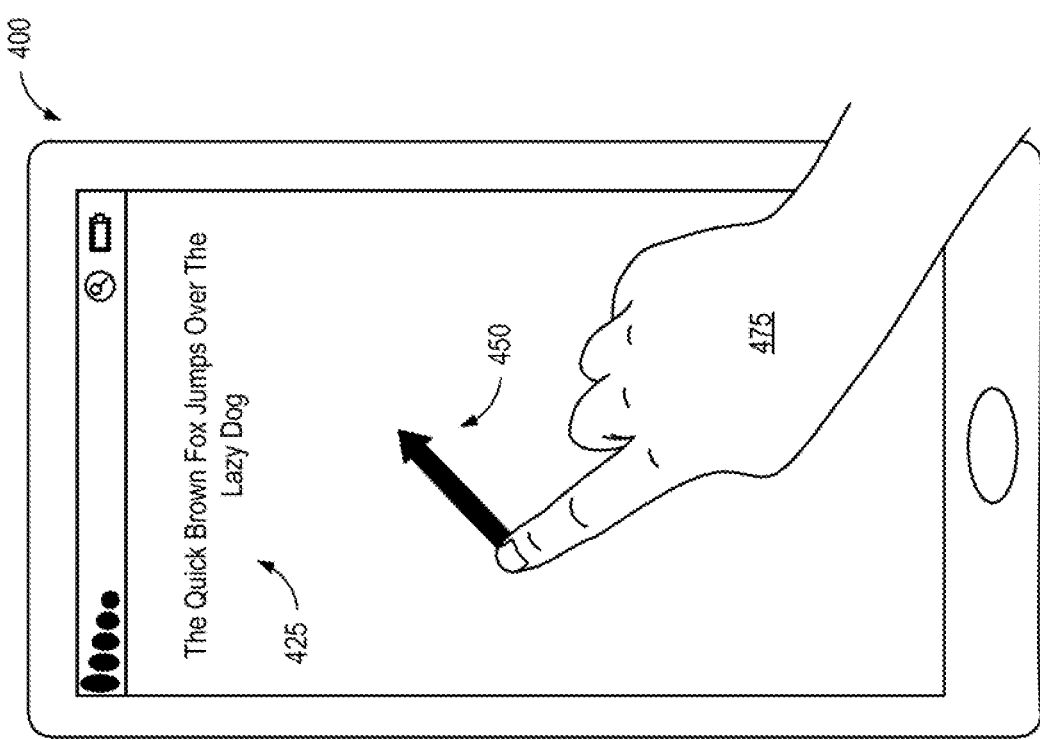
FIG. 4A illustrates a user performing a one-finger diagonal swipe gesture input on a touchscreen device to apply strikethrough formatting to selected text.

FIG. 4A illustrates a user 475 performing a one-finger diagonal swipe gesture input 450 on a touchscreen device 400 to apply strikethrough formatting 426 to selected text 425. FIG. 4B illustrates the strikethrough formatting 426 applied to the selected text 425 in response to the one-finger diagonal swipe gesture input 450.

Figure 5B:
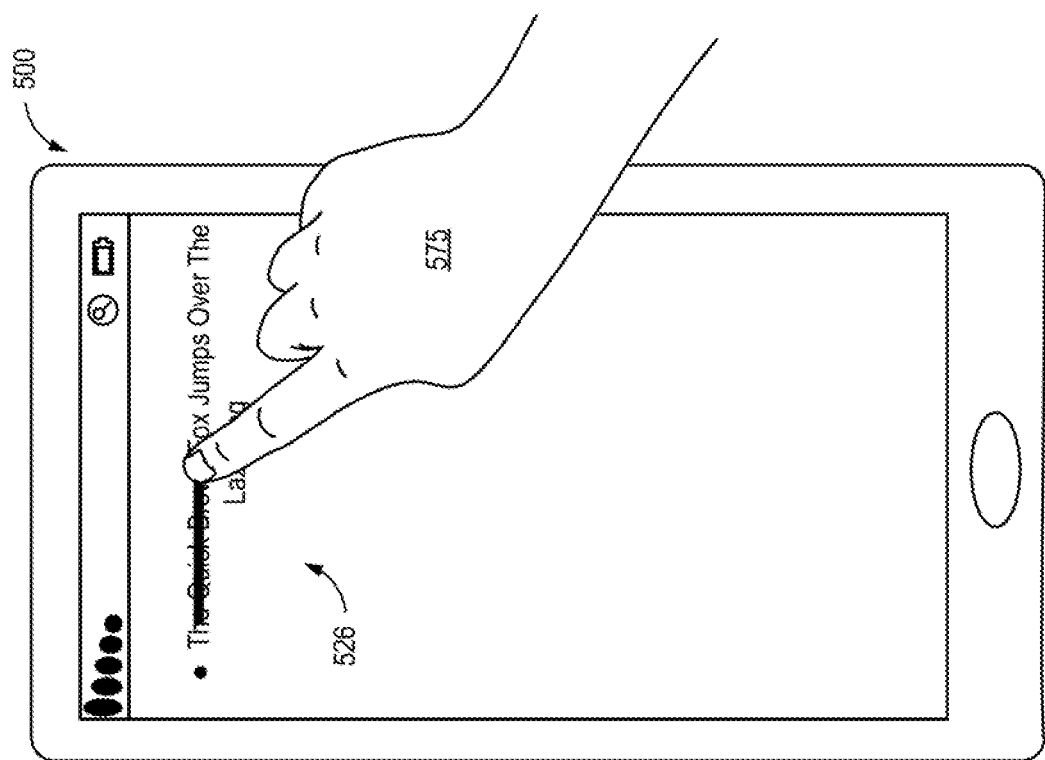
FIG. 5B illustrates the bulleted list formatting applied to the selected text in response to the one-finger horizontal swipe gesture input.
Figure 5A:
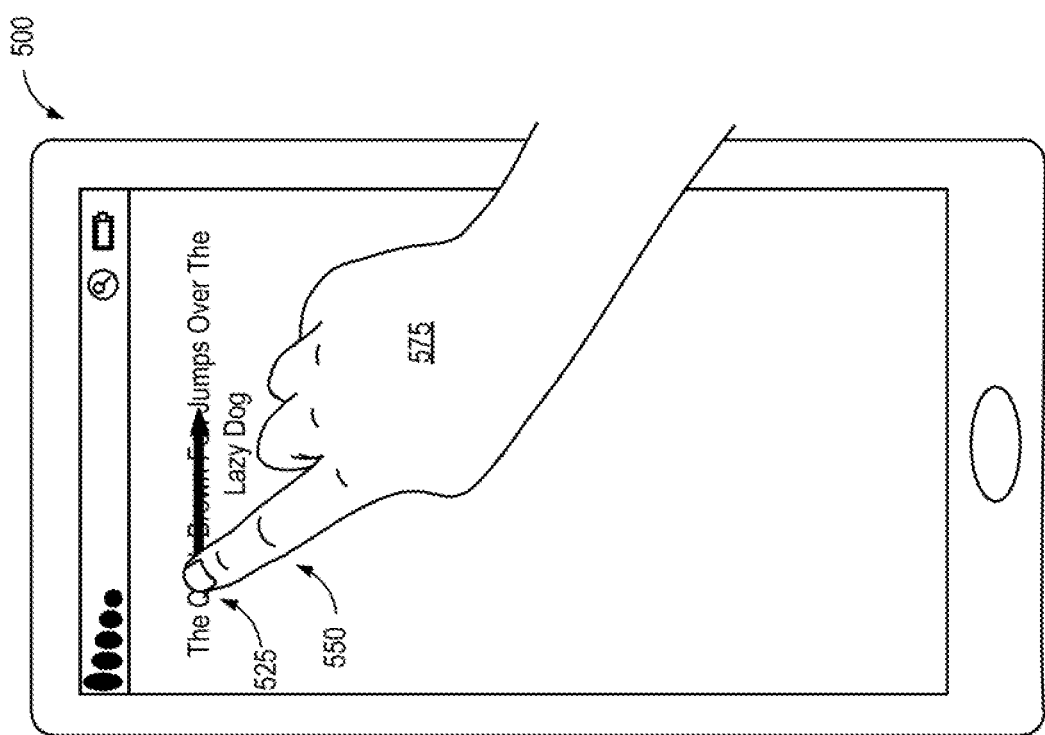
FIG. 5A illustrates a user performing a one-finger horizontal swipe gesture input on a touchscreen device to apply a bulleted list formatting to selected text.

FIG. 5A illustrates a user 575 performing a one-finger horizontal swipe gesture input 550 on a touchscreen device 500 to apply a bulleted list formatting 526 to selected text 525. FIG. 5B illustrates the bulleted list formatting 526 applied to the selected text 525 in response to the one-finger horizontal swipe gesture input 550.

Figure 6B:
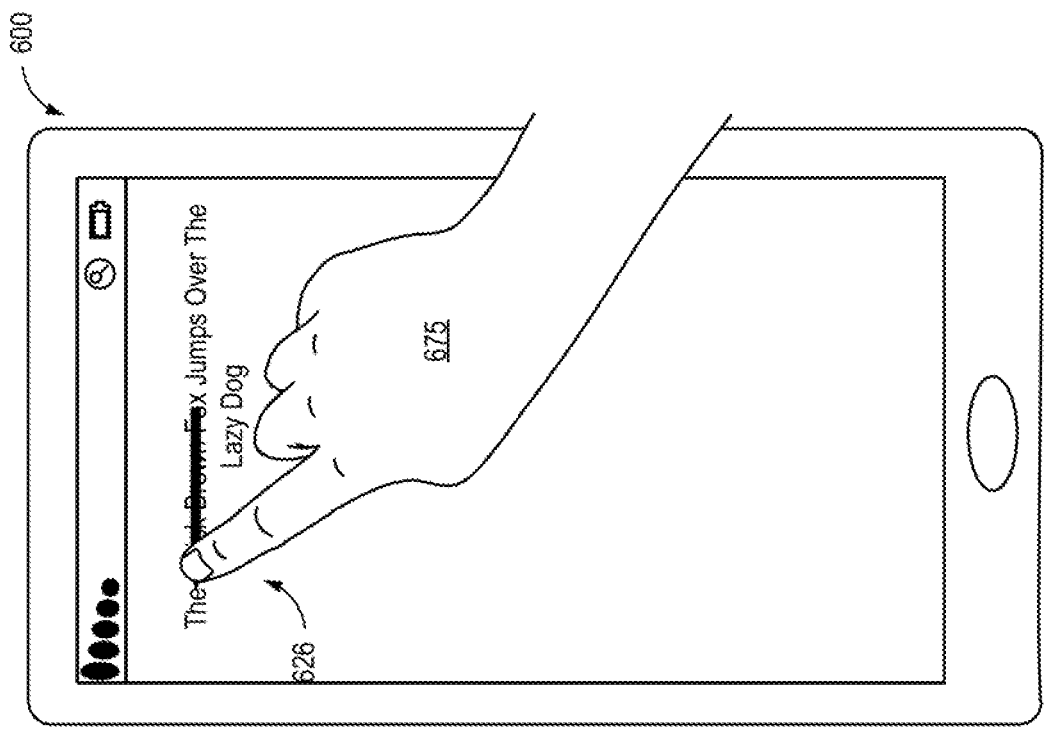
FIG. 6B illustrates the bulleted list formatting removed from the selected text in response to the reverse one-finger horizontal swipe gesture input.
Figure 6A:
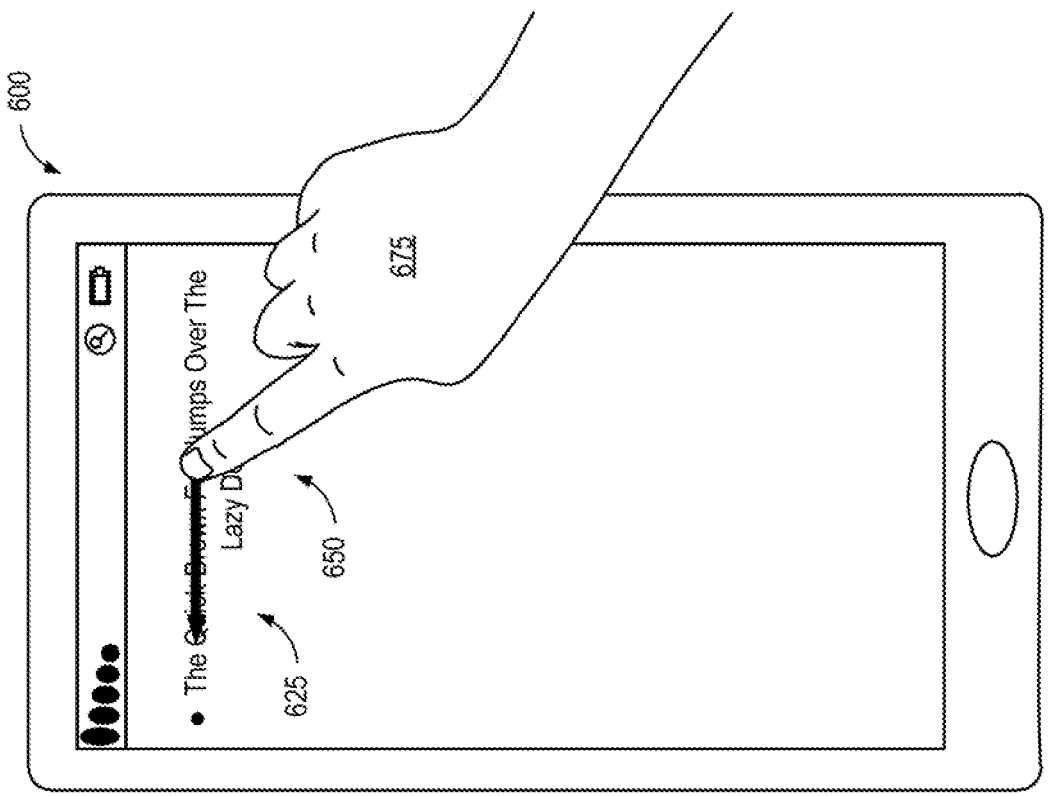
FIG. 6A illustrates a user performing a reverse one-finger horizontal swipe gesture input on a touchscreen device to remove a bulleted list formatting from selected text.

FIG. 6A illustrates a user 675 performing a reverse one-finger horizontal swipe gesture input 650 on a touchscreen device 600 to remove a bulleted list formatting 626 from selected text 625. FIG. 6B illustrates the bulleted list formatting 626 removed from the selected text 625 in response to the reverse one-finger horizontal swipe gesture input 650.

Figure 7B:
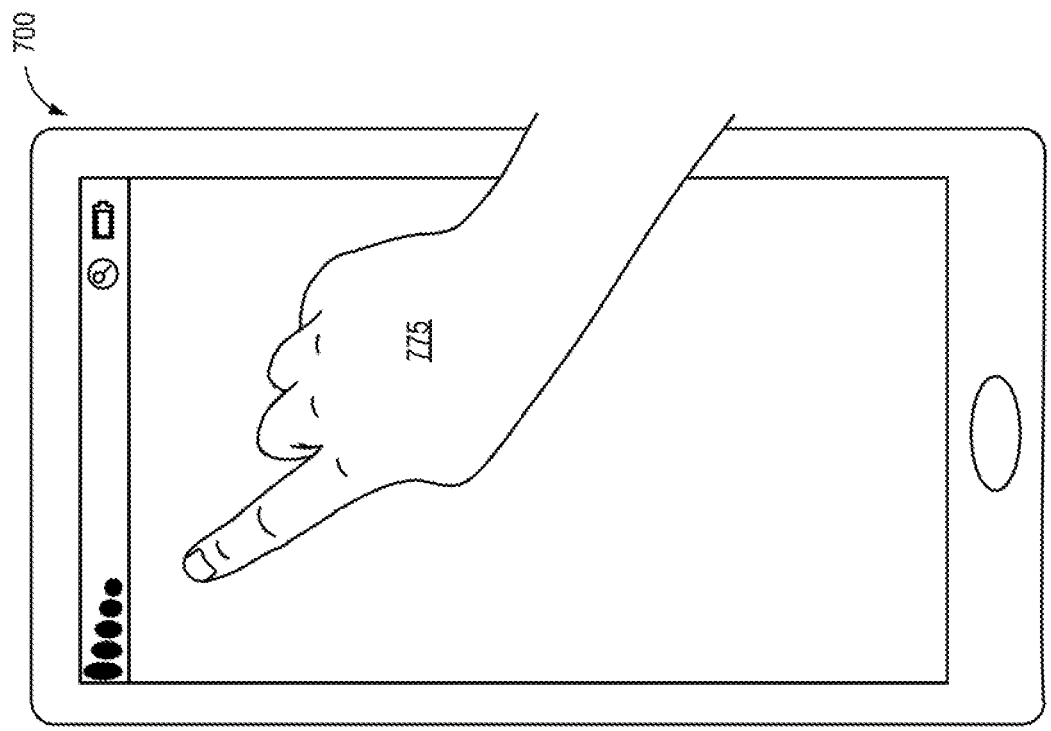
FIG. 7B illustrates the text deleted in response to the reverse one-finger horizontal swipe gesture input.
Figure 7A:
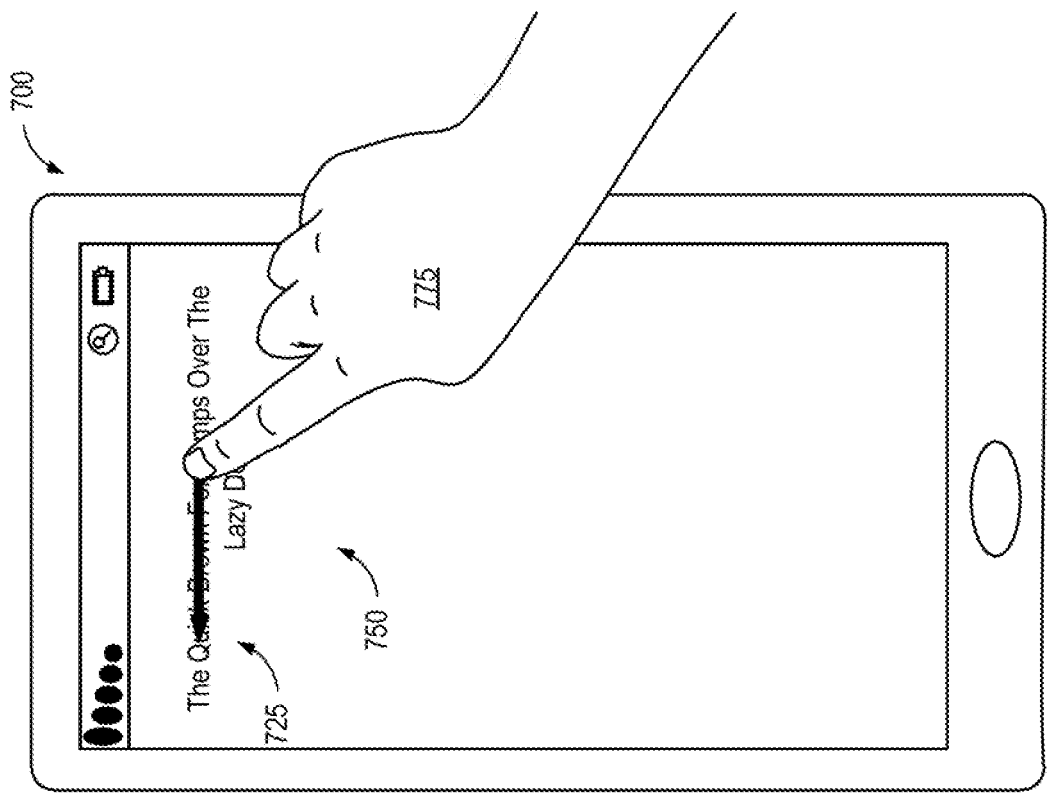
FIG. 7A illustrates a user performing a reverse one-finger horizontal swipe gesture input on a touchscreen device to delete underlying text.

FIG. 7A illustrates a user 775 performing a reverse one-finger horizontal swipe gesture input 750 on a touchscreen device 700 to delete underlying text 725. FIG. 7B illustrates the underlying text 725 deleted in response to the reverse one-finger horizontal swipe gesture input 750.

Figure 8B:
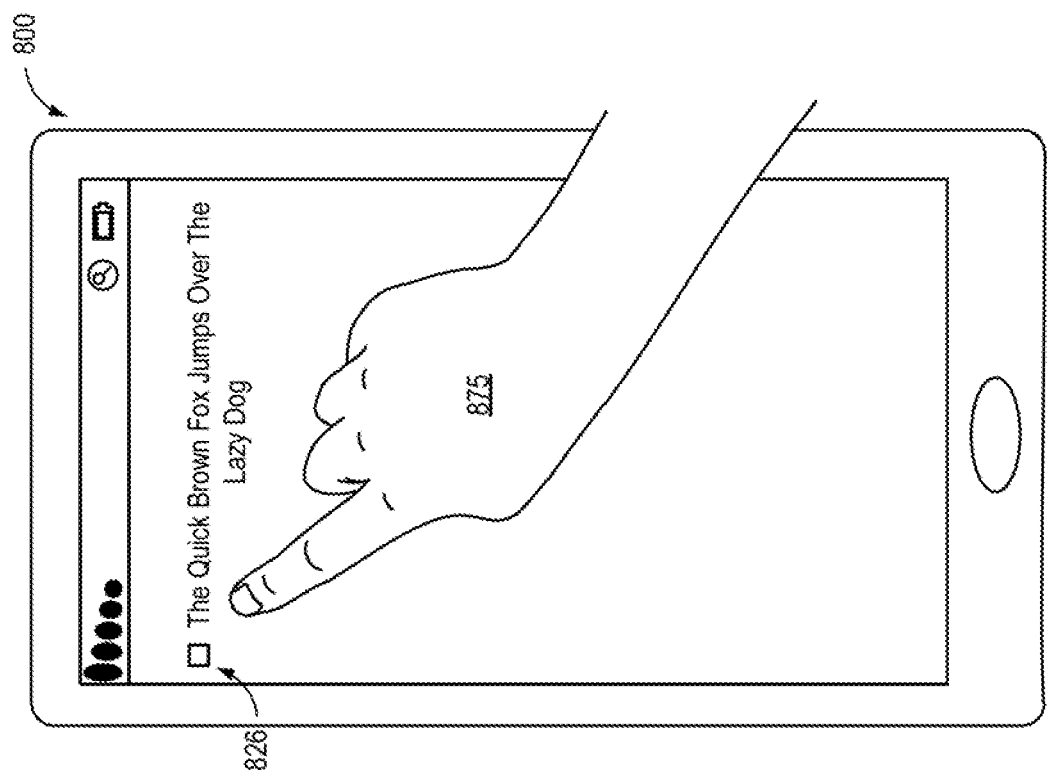
FIG. 8B illustrates the checkbox in place of the bullet point in response to the one-finger press and hold gesture input.
Figure 8A:
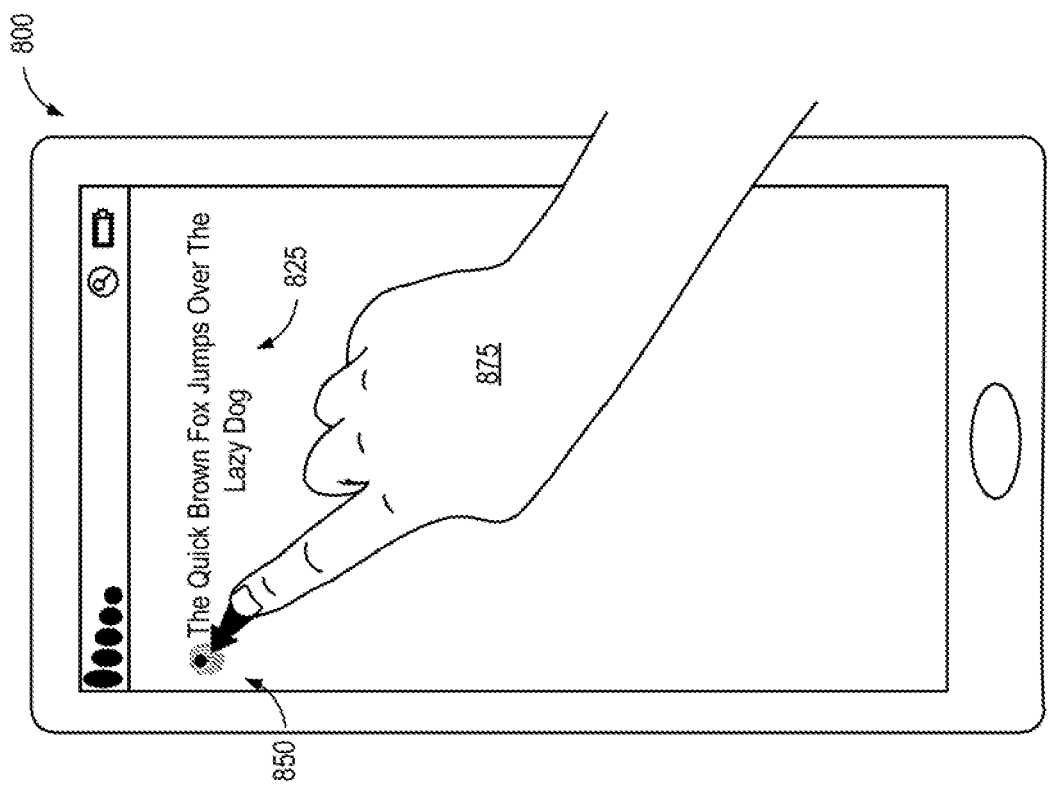
FIG. 8A illustrates a user converting a bullet point into a checkbox using a one-finger press and hold gesture input.

FIG. 8A illustrates a user 875 converting a bullet point of text 825 into a checkbox 826 using a one-finger press and hold gesture input 850 on a touchscreen device 800. FIG. 8B illustrates the checkbox 826 in place of the bullet point of text 825 in response to the one-finger press and hold gesture input 850.

Figure 9B:
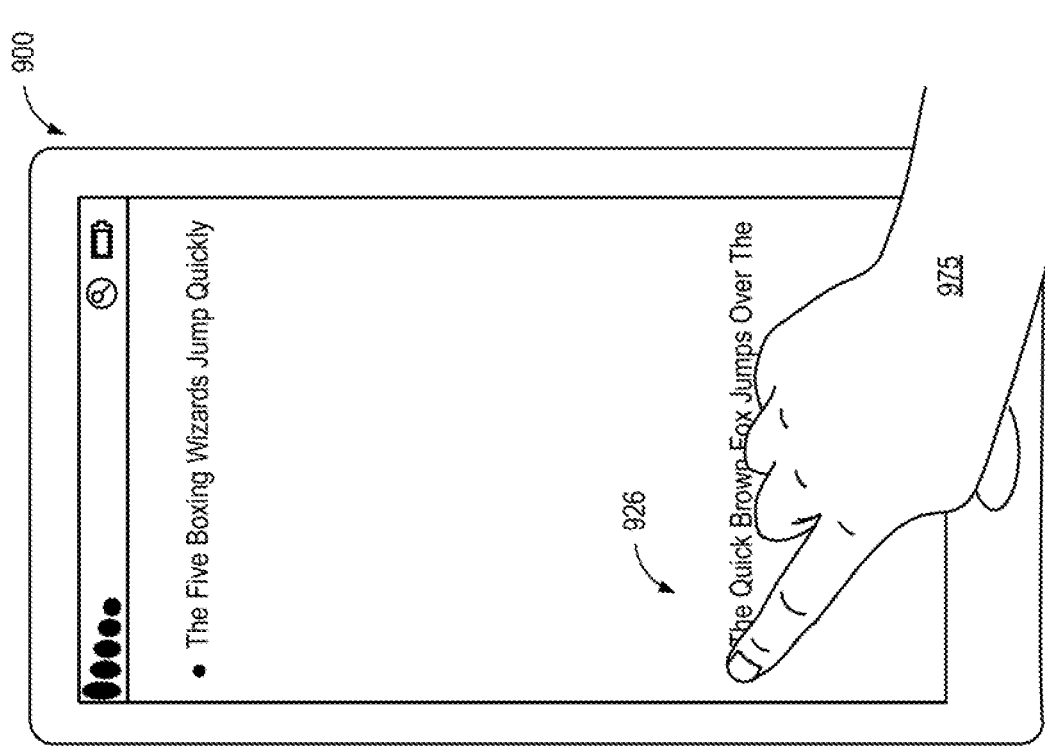
FIG. 9B illustrates the text objects in the bulleted list rearranged based on the hold and drag gesture input.
Figure 9A:
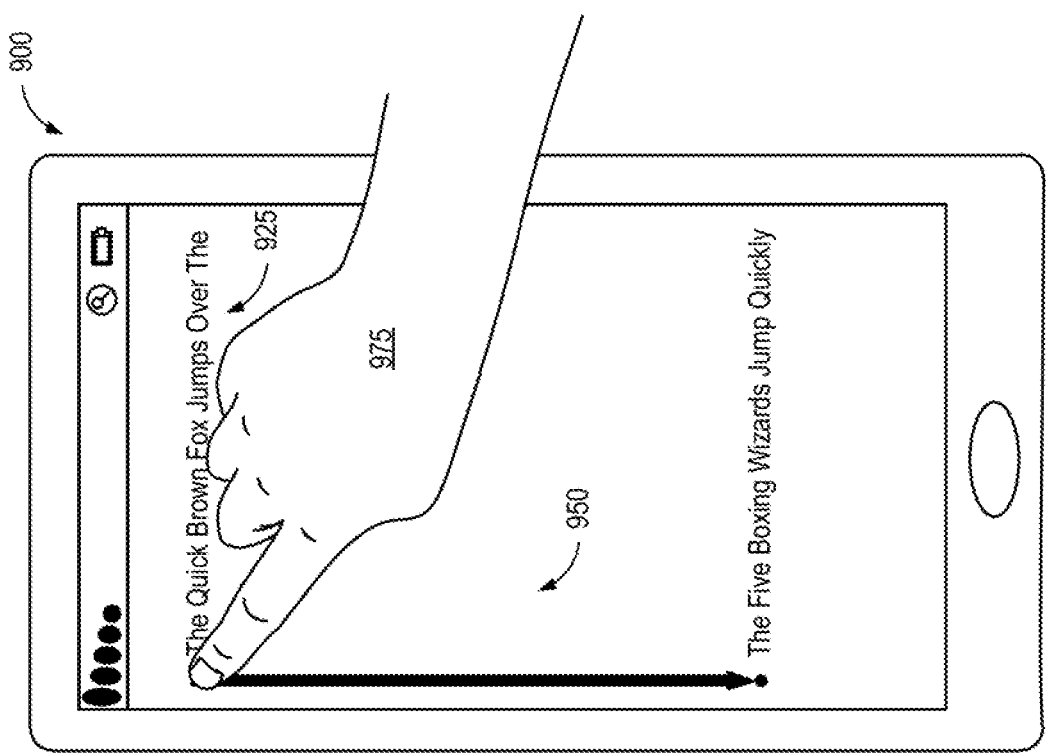
FIG. 9A illustrates a user dragging a bullet point via a hold and drag gesture input on a touchscreen device to rearrange the order of text objects in a bulleted list.

FIG. 9A illustrates a user 975 dragging a bullet point of text 925 via a hold and drag gesture input 950 on a touchscreen device 900 to rearrange the order of text objects in a bulleted list. FIG. 9B illustrates the text objects in the bulleted list rearranged based on the hold and drag gesture input 950, at 926.

Figures 10A, 10B:
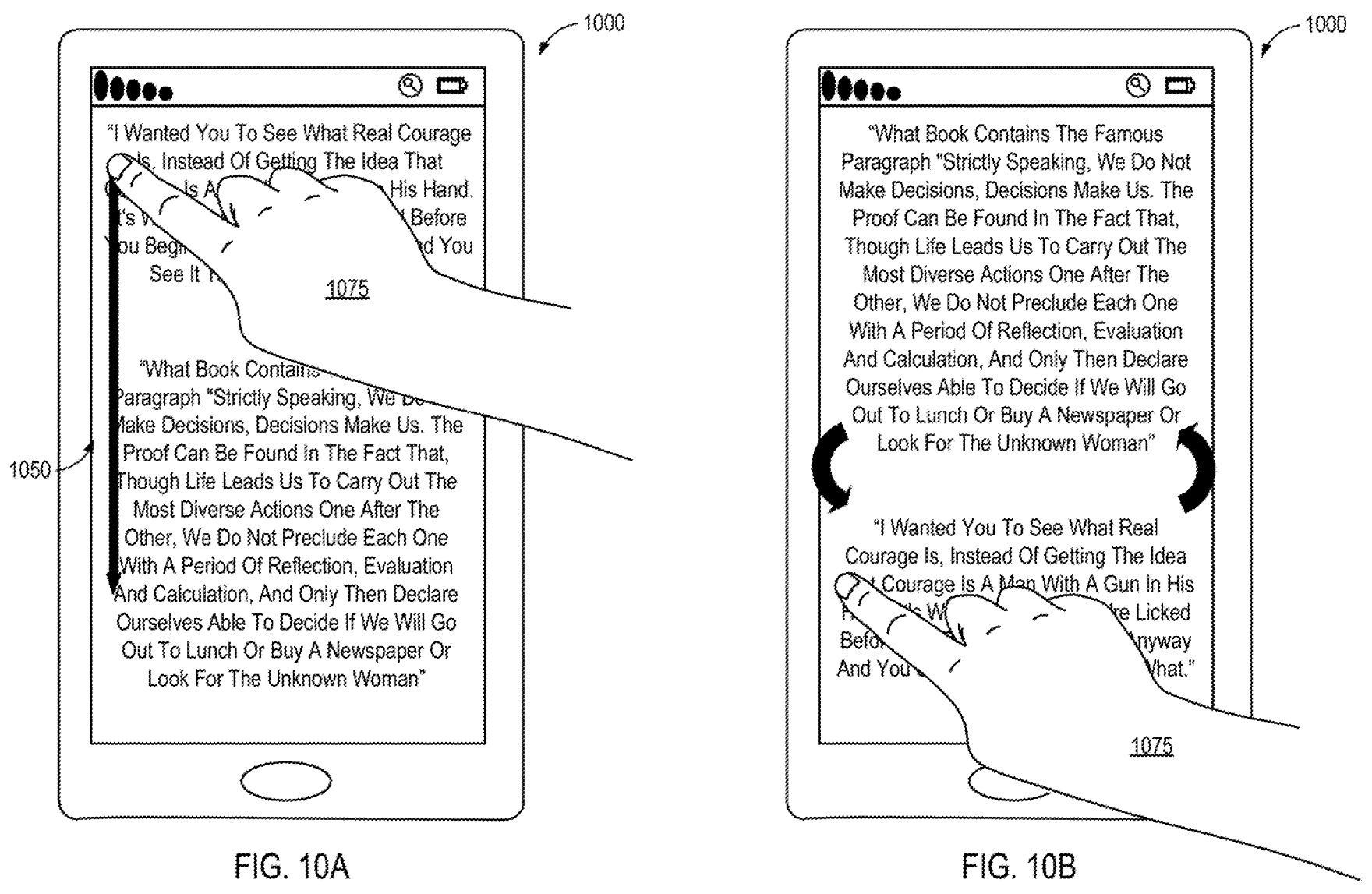

FIG. 10A illustrates a user 1075 rearranging the order of paragraphs of text using a hold and drag gesture input 1050 on a paragraph displayed on a touchscreen device 1000. FIG. 10B illustrates two paragraphs rearranged based on the hold and drag gesture input 1050.

Figure 11B:
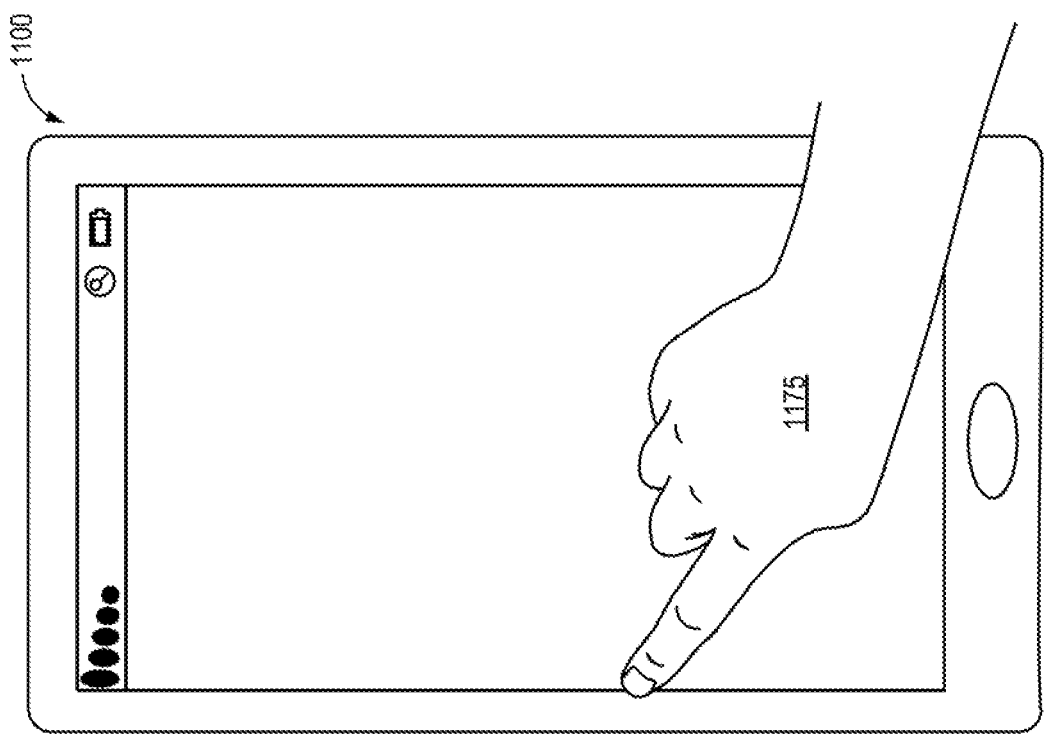
FIG. 11B illustrates the paragraph of text deleted in response to the flicking gesture input.
Figure 11A:
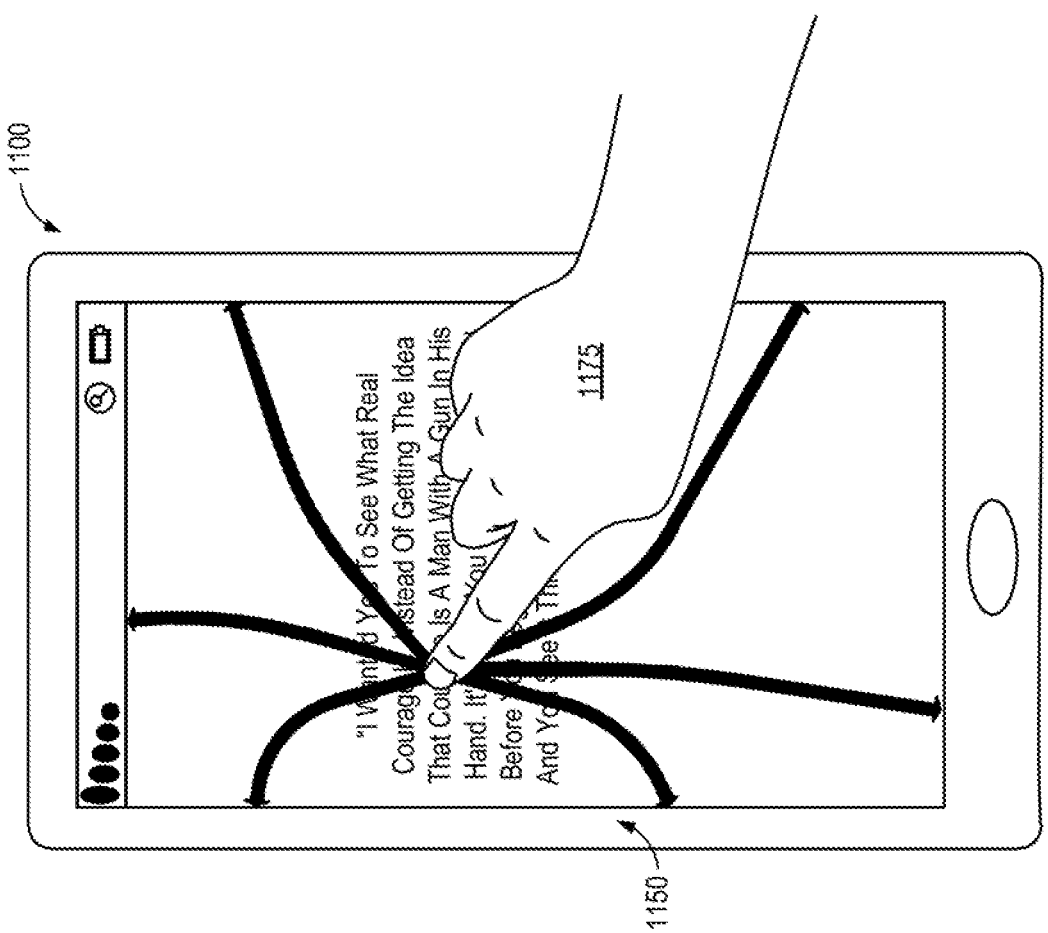
FIG. 11A illustrates a user deleting a selected paragraph by performing a flicking gesture input on a touchscreen device.

FIG. 11A illustrates a user 1175 deleting a selected paragraph by performing a flicking gesture input 1150 on a touchscreen device 1000. FIG. 11B illustrates the paragraph of text deleted in response to the flicking gesture input 1150.

Figure 12B:
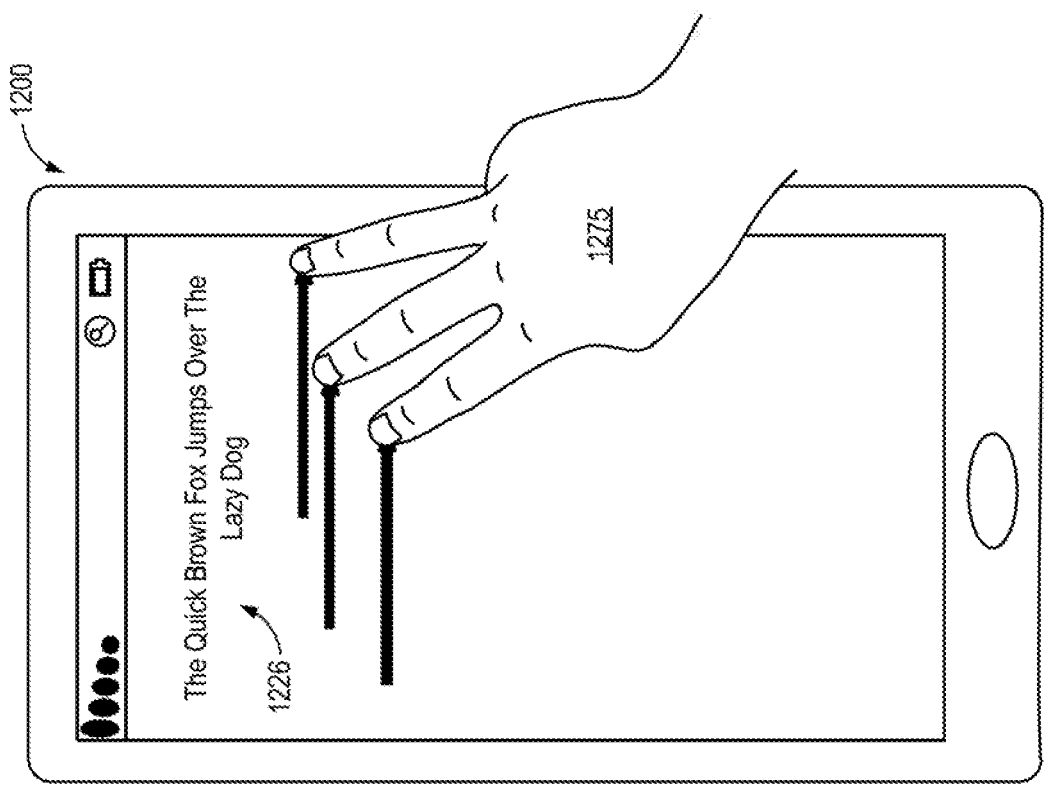
FIG. 12B illustrates the selected text with a center-justification formatting applied in response to the three-finger horizontal drag gesture input.
Figure 12A:
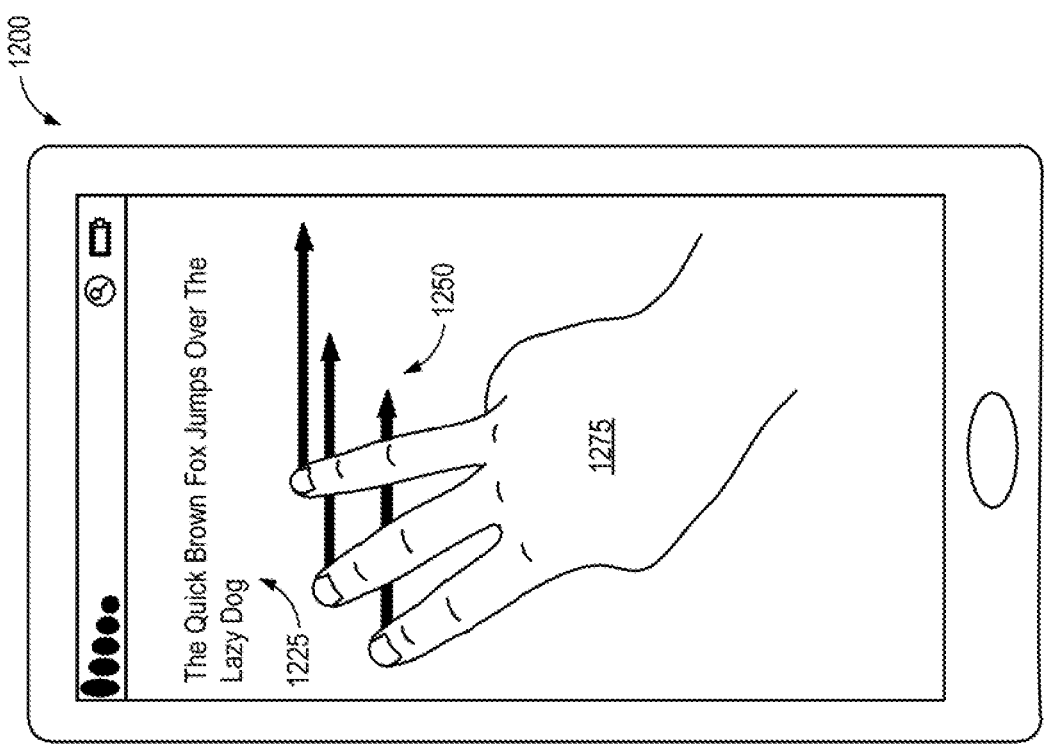
FIG. 12A illustrates a user performing a three-finger horizontal drag gesture input on a touchscreen device to modify a justification formatting of selected text from left-justified to center-justified.

FIG. 12A illustrates a user 1275 performing a three-finger horizontal drag gesture input 1250 on a touchscreen device 1200 to modify a justification formatting of selected text 1225 from left-justified (FIG. 12A) to center-justified (FIG. 12B). FIG. 12B illustrates the selected text 1226 with a center-justification formatting applied in response to the three-finger horizontal drag gesture input 1250.

Figure 12D:
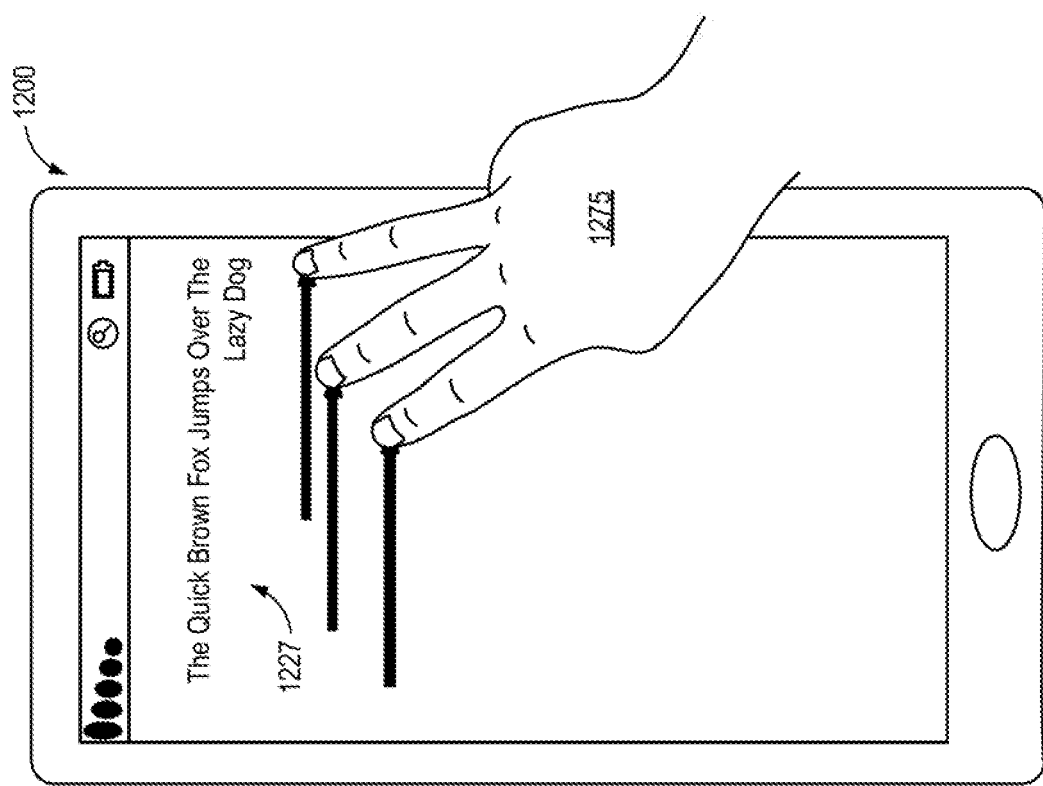
FIG. 12D illustrates the selected text with a right-justification formatting applied in response to the three-finger horizontal drag gesture input.
Figure 12C:
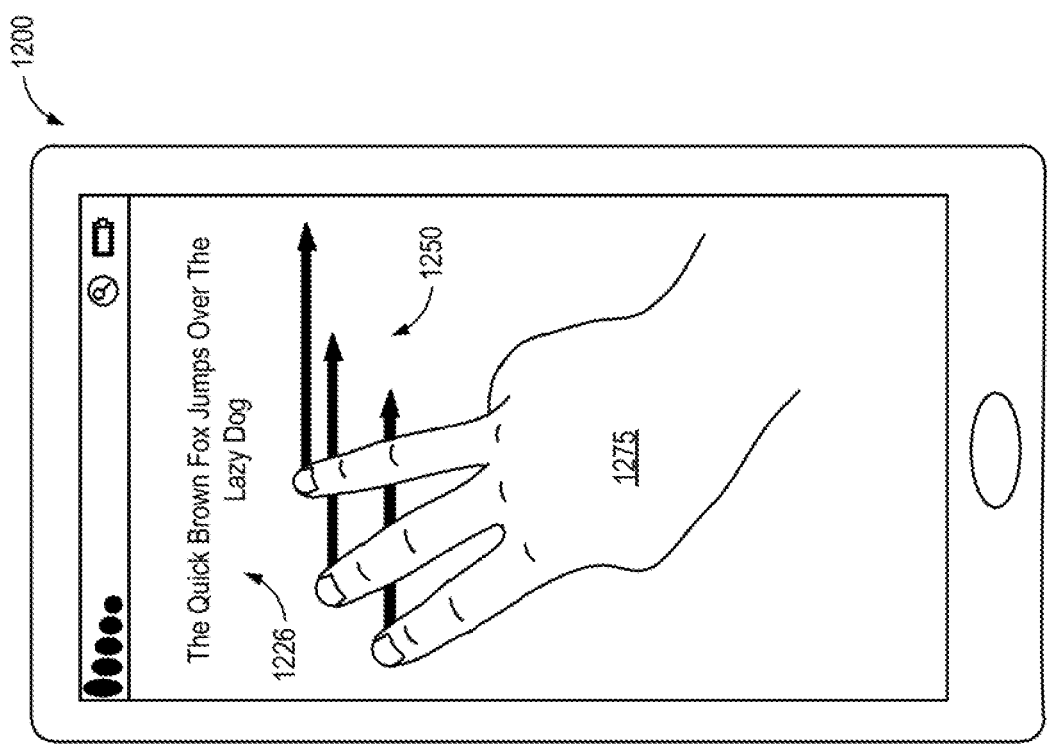
FIG. 12C illustrates the user performing the three-finger horizontal drag gesture input on the touchscreen device to modify the justification formatting of the selected text from center-justified to right-justified.

FIG. 12C illustrates the user 1275 performing the same three-finger horizontal drag gesture input 1250 on the touchscreen device 1200 to modify the justification formatting of the selected text 1226 from center-justified (FIGS. 12B and 12C) to right-justified (FIG. 12D). FIG. 12D illustrates the selected text 1227 with a right-justification formatting applied in response to the three-finger horizontal drag gesture input 1250.

Figure 12F:
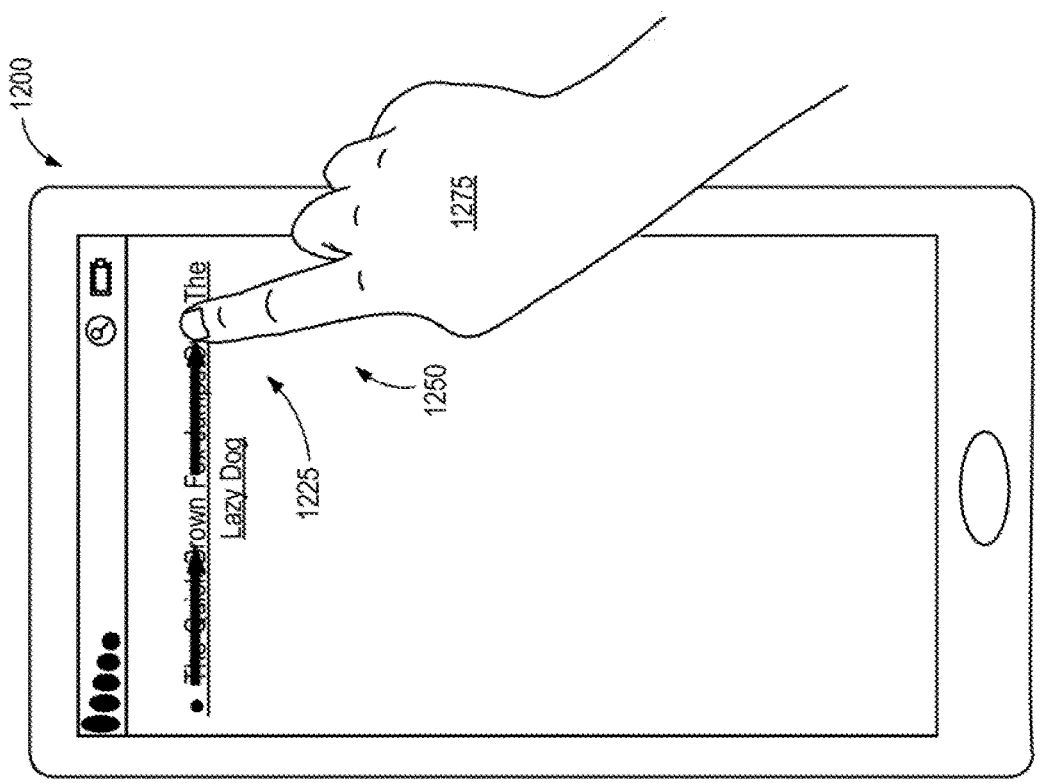
FIG. 12F illustrates the underlining formatting rule applied to the underlying text.
Figure 12E:
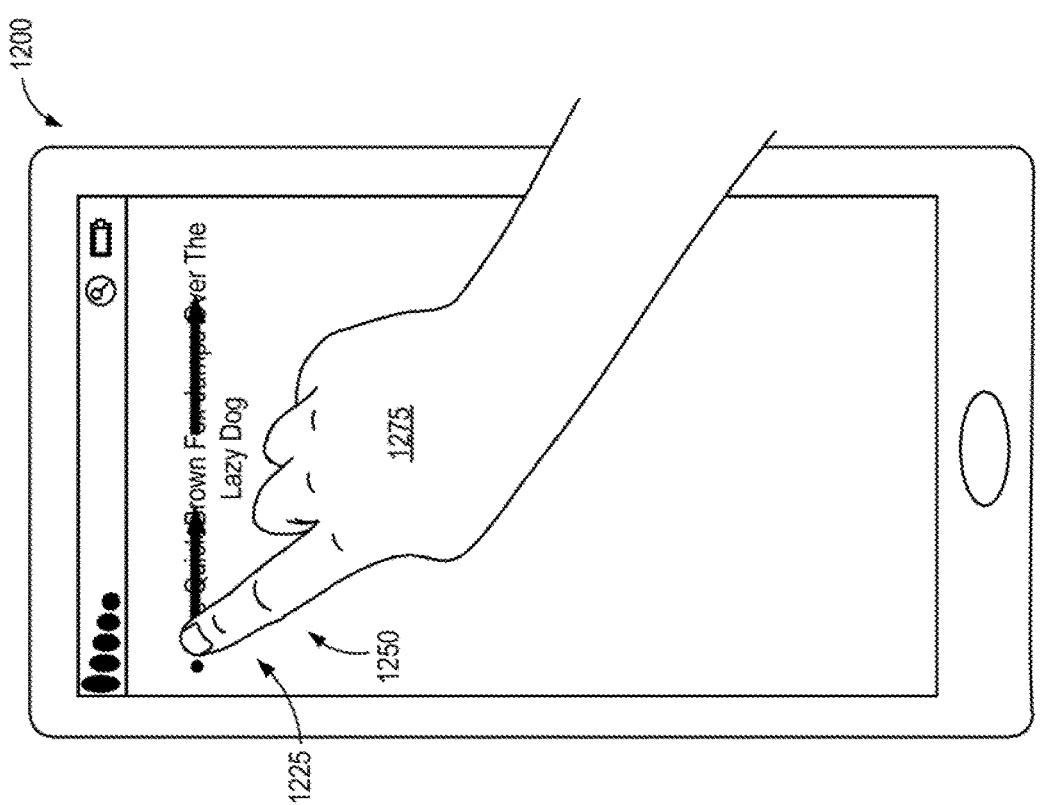
FIG. 12E illustrates a user performing a swiping gesture associated with an underling formatting rule.

FIG. 12E illustrates the user 1275 performing a swiping gesture 1250 on the touchscreen device 1200 to add under-line formatting to the underlying text 1225. In the illustrated embodiment, the gesture associated with underlining is a horizontal swiping gesture. In some embodiment's, the horizontal swiping gesture might be broken into two parts in which the finger is lifted (or a change in pressure is made) for part of the swipe. FIG. 12F illustrates the underlining formatting rule applied to the underlying text 1225.

Figure 12H:
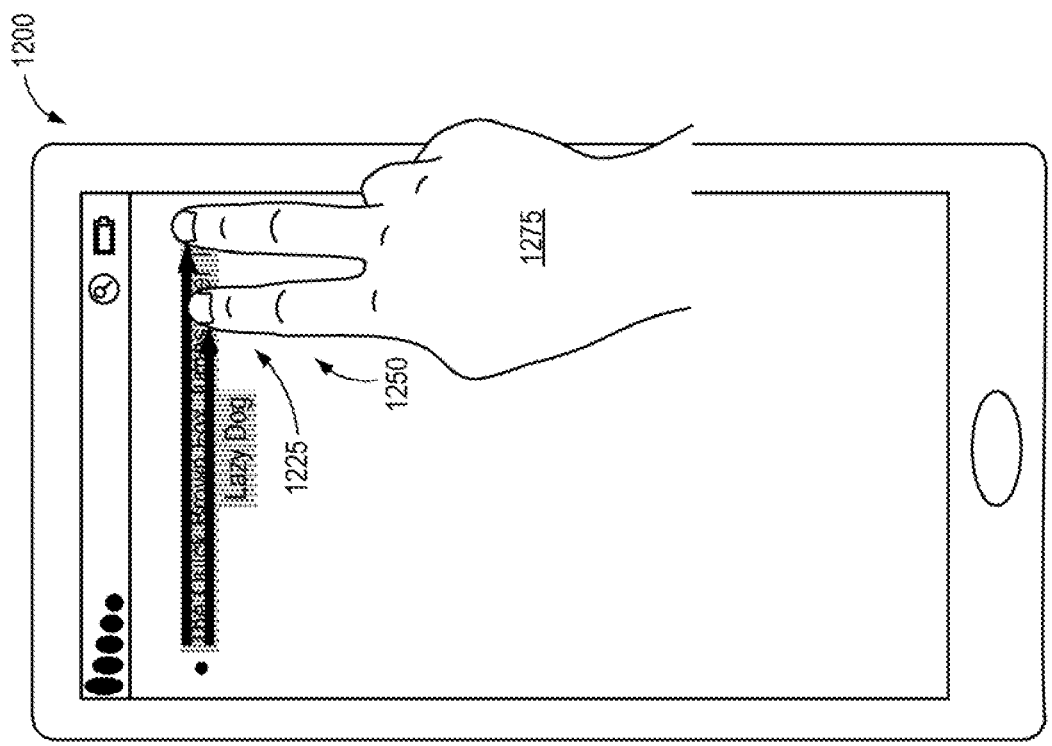
FIG. 12H illustrates a two-finger horizontal swiping gesture used to apply a highlighting formatting rule to underlying text.
Figure 12G:
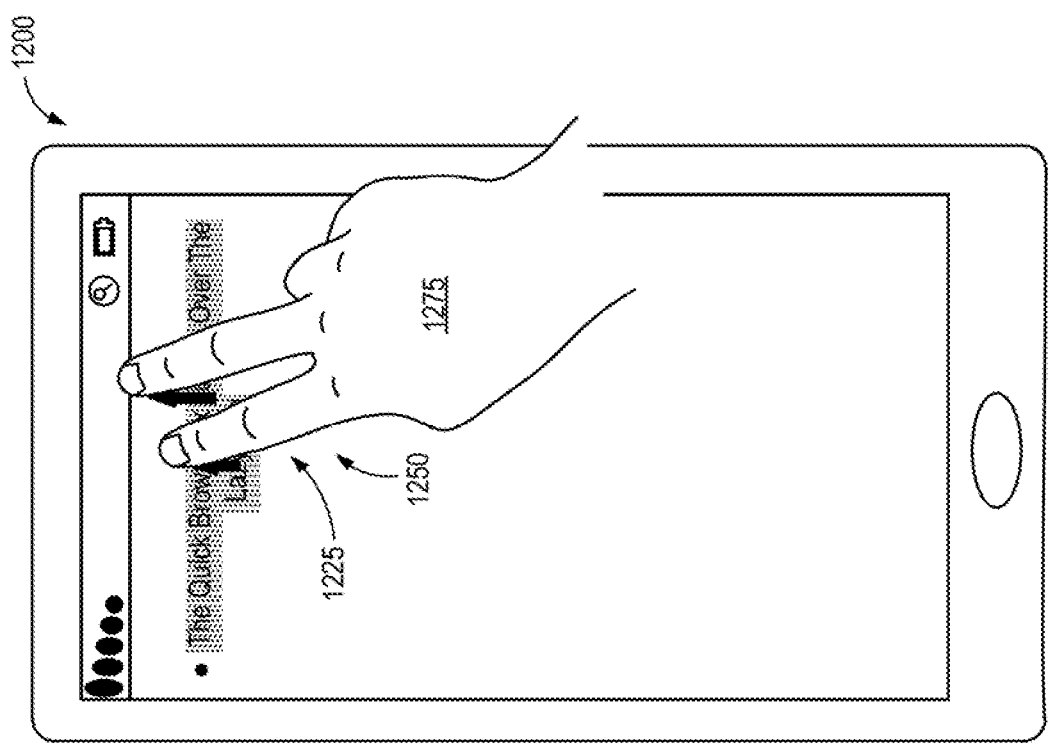
FIG. 12G illustrates previously selected text having a highlighting formatting rule applied with a two-finger upward gesture.

FIG. 12G illustrates previously selected text 1225 having a highlighting formatting rule applied with a two-finger upward gesture 1250. The text 1225 may have been selected in any of a variety of manners, including contextually, based on the location, pressure, or size (area) of the gesture 1250. The text 1225 may have been selected using cursors and/or a series of taps. In one embodiment a single tap may select an underlying letter, a second tap may select a word, a third tap may select a phrase, a fourth tap may select a sentence, a fifth tap may select a paragraph, a six tap may select a section or a page. In various embodiments, any of the text components listed above may be selected using any number of taps.

FIG. 12H illustrates a two-finger horizontal swiping gesture 1250 used to apply a highlighting formatting rule 1225 to underlying text. In the illustrated embodiment, the portion of text to which the formatting rule is applied may be based on the size of the gesture, contextually based on recent changes to portions of the underlying text (i.e., only apply the formatting rule to the portion of text most recently changed or changed within a predetermined time period), based on the pressure applied during the gesture, and/or based on the type of formatting being applied. In some embodiments a color of the highlighting might be selected using a gesture, such as for example a gesture resembling a letter or letters (e.g., the first and/or second letter) associated with a desired color.

Figure 13:
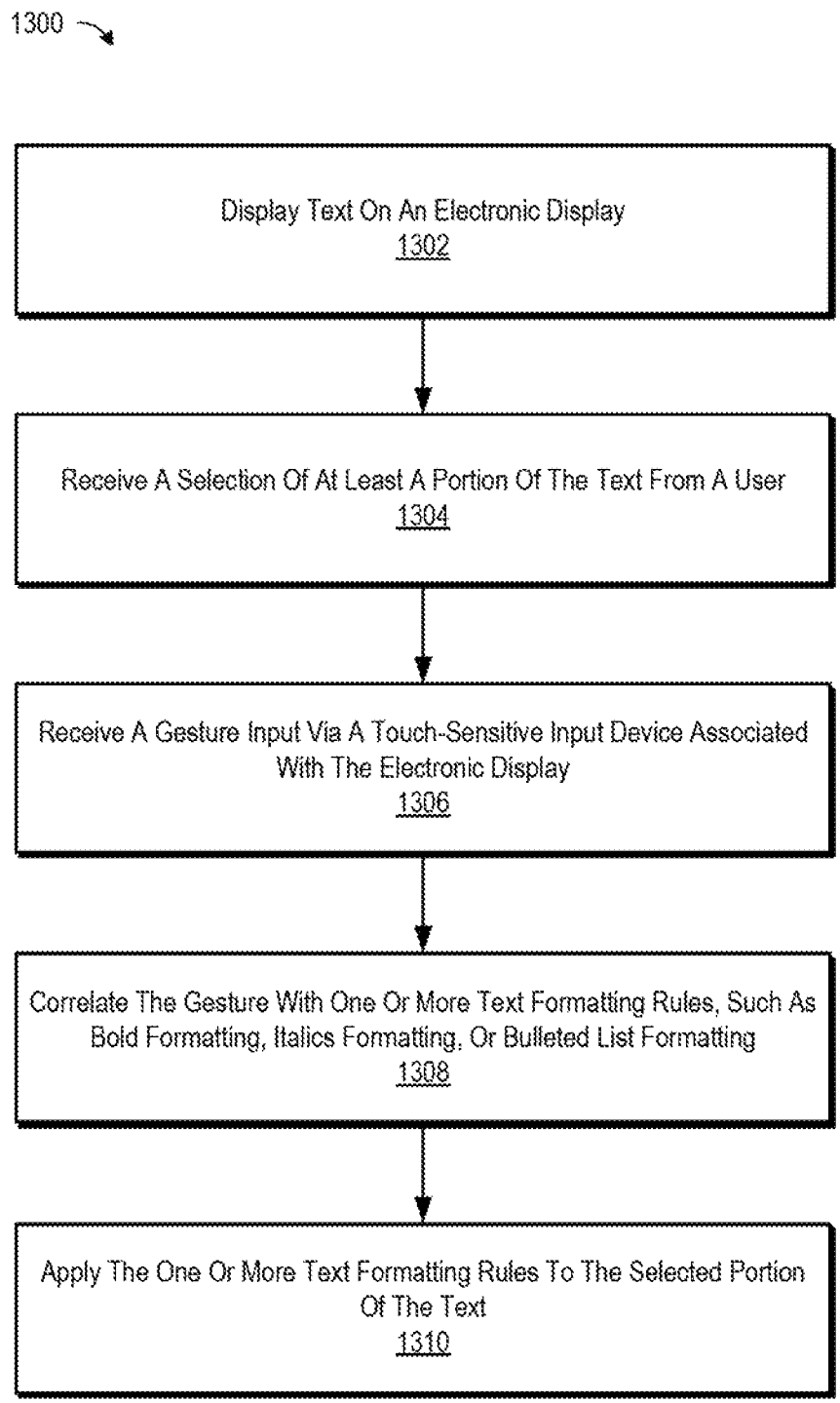
FIG. 13 illustrates a flow chart of one example of a method for applying a gesture-based format to selected text.

FIG. 13 illustrates a flow chart of one example of a method 1300 for applying a gesture-based format to selected text. Initially, text may be displayed on an electronic display, at 1302. A user may use the operating system's selection cursor or other selection approach specific to a document or text editing application to explicitly select a group or portion of text within a body of text. After the selection of at least a portion of the text is received, at 1304, the user may perform an on-screen gesture input, such as a pinch or a swipe, at 1306.

The system may correlate or otherwise identify one or more specific text formatting functions (i.e., formatting rules), such as bolding, bulleting, italicizing, highlighting, reordering, justifying, etc., at 1308. The one or more formatting rules may then be applied to the selected portion of the text 1310.

Figure 14:
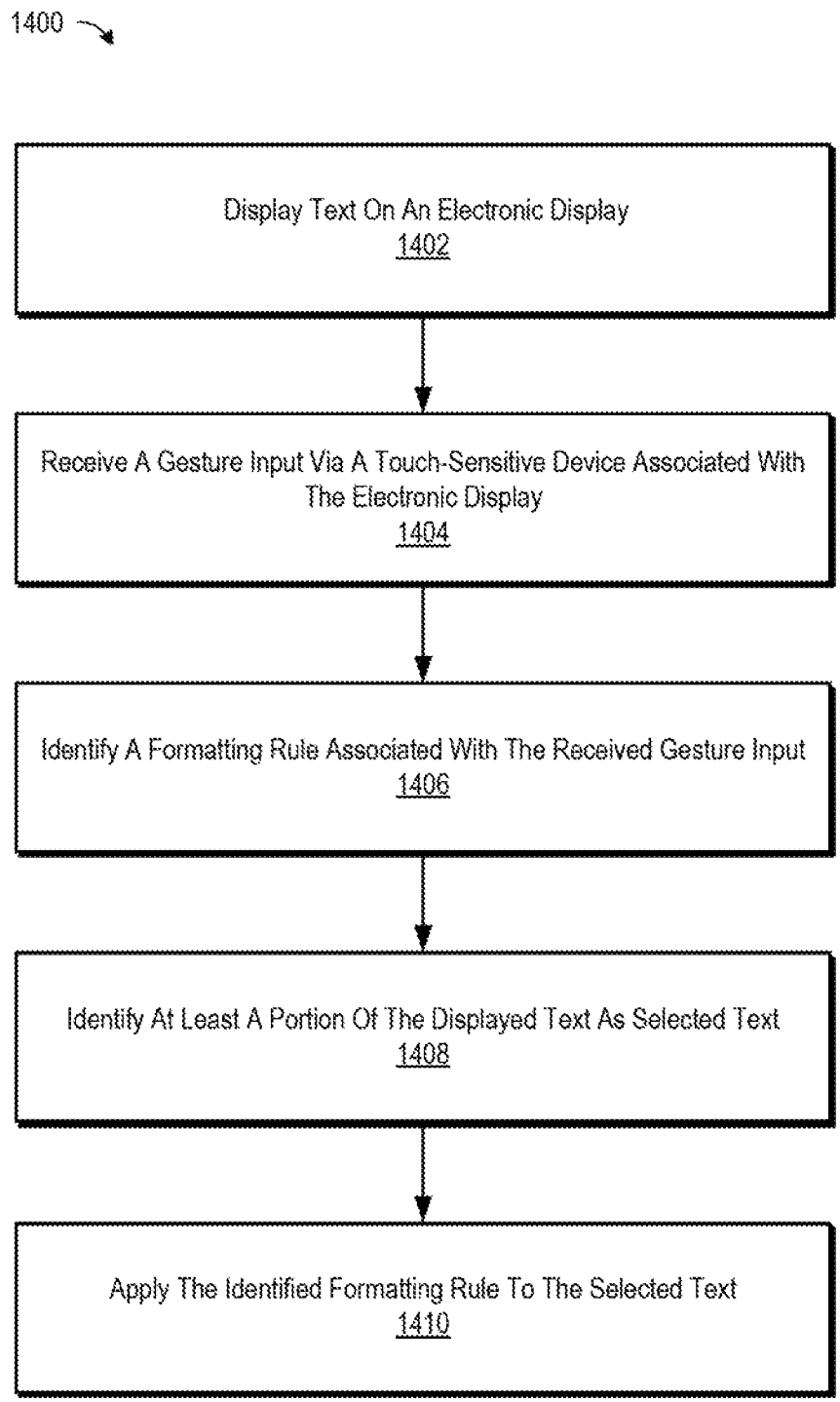
FIG. 14 illustrates a flow chart of another example of a method for applying a gesture-based format to selected text.

FIG. 14 illustrates a flow chart of another example of a method 1400 for applying a gesture-based format to selected text. Text may be displayed on an electronic display, at 1402. A gesture input may be received, 1404, via a touch-sensitive device associated with the electronic display. A formatting rule associated with the received gesture input may be identified, at 1406. At least a portion of the displayed text may be identified as selected text, at 1408, as defined by the received gesture input and/or contextually based on the type of gesture input, size of the gesture input, location of the gesture input, the most recently edited or added text, and/or other contextual factors.

The identified formatting rule may be applied to the selected text, at 1410. The formatting rule may include various formatting changes to the existing text, such as bolding, bulleting, italicizing, highlighting, reordering, justifying, etc.

Figure 15:
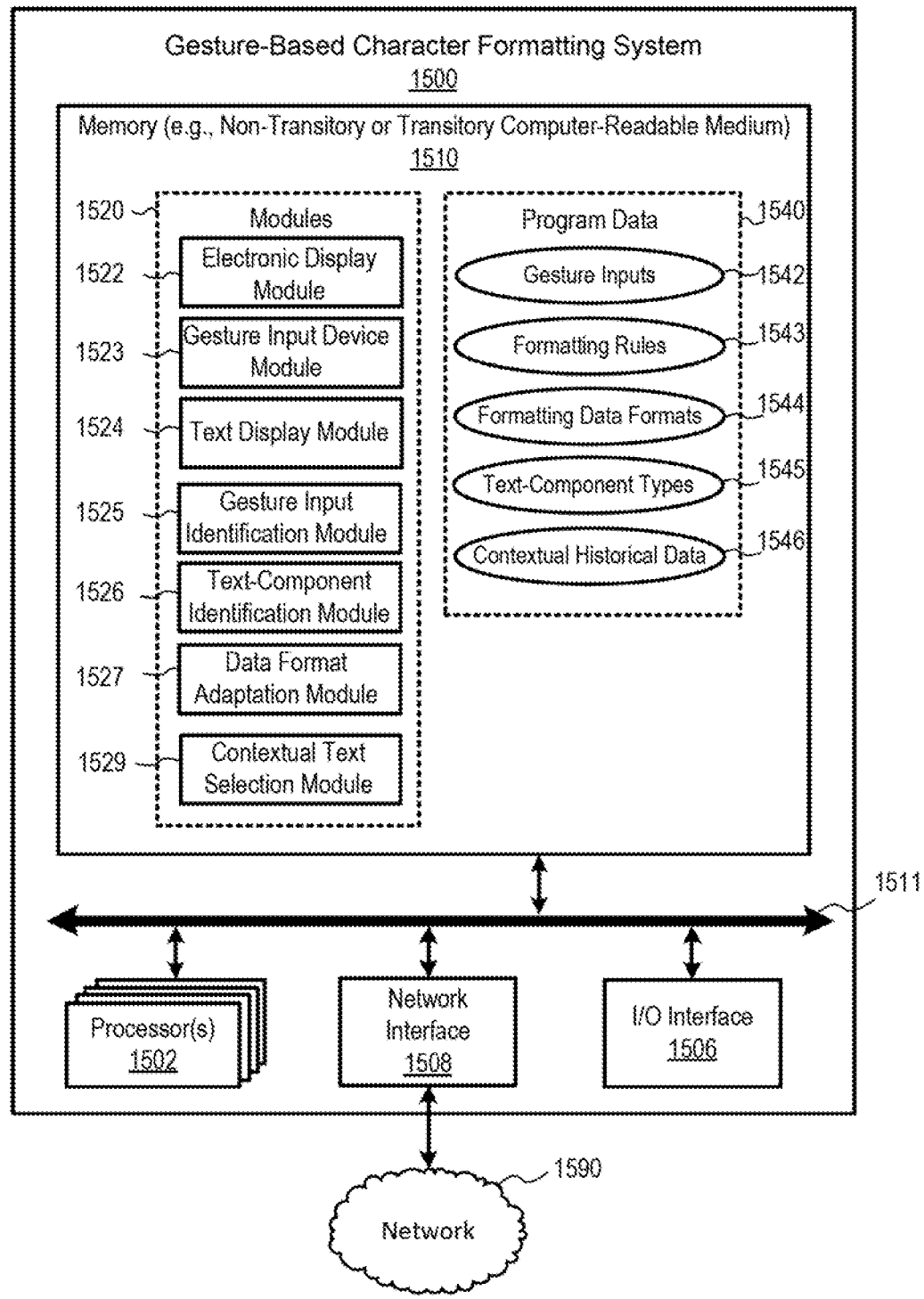
FIG. 15 illustrates an example of a system that provides for gesture-based text formatting.

FIG. 15 illustrates an example of a system 1500 that provides for gesture-based text formatting. As illustrated, the system 1500 may include access to local or remote memory 1510 or another non-transitory or transitory computer-readable medium. A processor (which may include multiple processors 1502) may be connected, at 1511, to the memory 1510, a network interface 1508, and/or an I/O interface 1506. An external network 1590 may be available as well.

The memory 1510 may include various modules 1520 and/or program data 1540 to execute the systems and methods described herein. One or more of the illustrated modules 1520 and program data 1540 may be omitted, duplicated, combined with other modules 1520 and/or program data 1540, and/or further subdivided into sub-modules. As illustrated, an electronic display module 1522 may be configured to display text and/or other graphical elements on an electronic display associated with the system 1500. A gesture input device module 1523 may be configured to receive gesture inputs (potentially via I/O interface 1506 or another wired or wireless connection). A text display module 1524 may be configured to function in conjunction with the electronic display module 1522 to display text on the electronic device. A gesture input identification module 1525 may be configured to identify which of a plurality of gesture inputs has been provided by a user and which of a plurality of formatting rule(s) are associated with the received gesture input.

As previously described, in some embodiments one or more of the gesture inputs are associated with text-components that identify to which portion of the text an identified formatting rule(s) should be applied. In such embodiments, a text-component identification module 1526 may identify which text-component is associated with a received gesture input.

In various embodiments, a data format adaptation module 1527 may determine in which of a plurality of data formats the text is stored and then apply the identified formatting rule for the selected text according to the protocols of the particular data format. For example, each of the plurality of formatting rules may be defined for application to text stored in any number of data formats, such as XML, JSON, TOML, and HTML. The data format adaptation module 1527 may determine the protocol for modifying the data file that stores the text to, for example, tag the appropriate text with the identified formatting rule.

A contextual text selection module 1529 may perform the contextual analyses described herein to select text for the application of an identified formatting rule. The program data 1540 may include a data store of various gesture inputs 1542, formatting rules 1543, formatting data formats (e.g., XML, JSON, etc.) 1544, text-component types 1545, and/or contextual historical data 1546. As specified herein, the program data 1540 may comprise a data store that associates each of a plurality of gesture inputs 1542 with one or more formatting rules 1543 and, in some embodiments, one or more text-component types 1545.

Figure 16A:
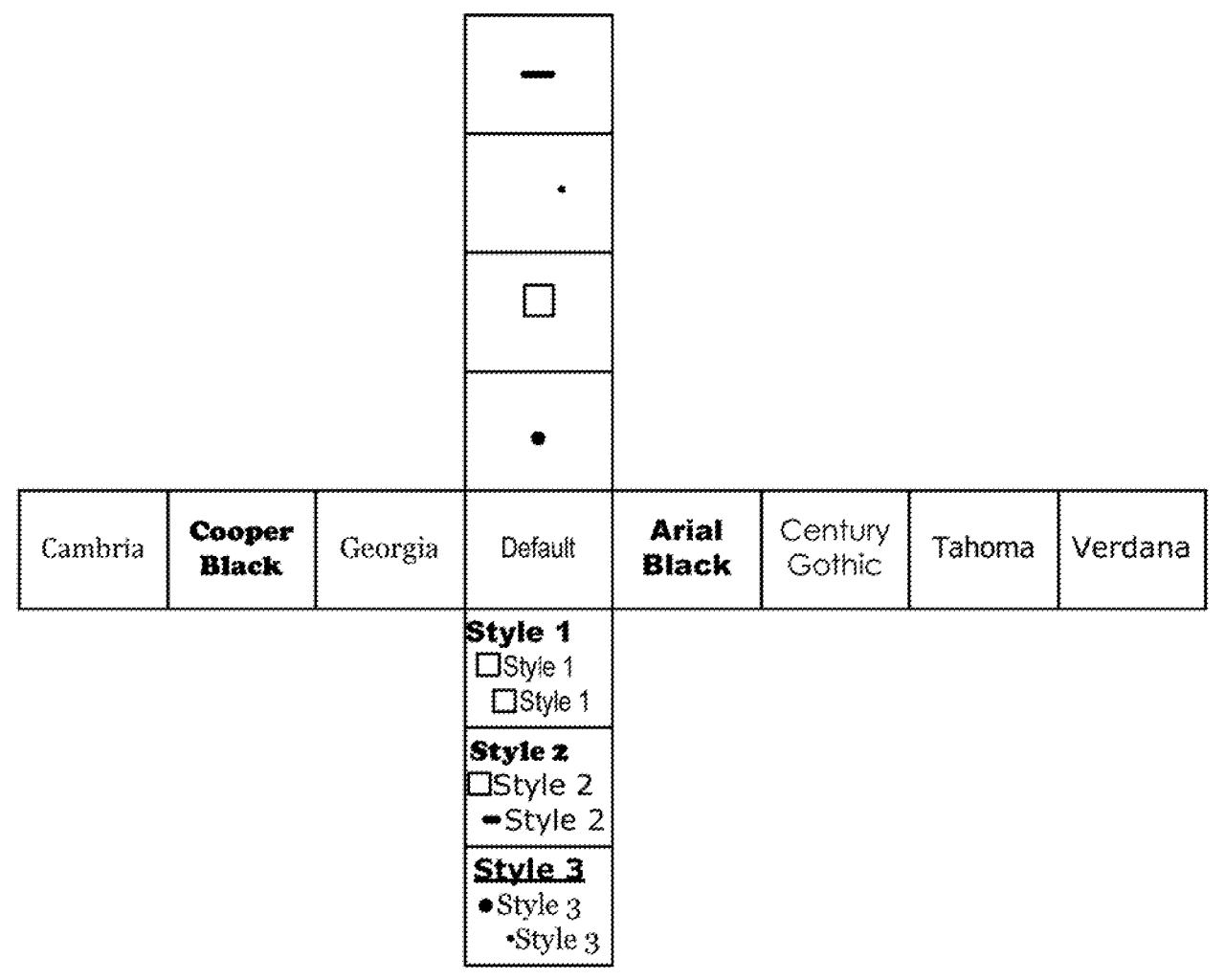

FIG. 16A illustrates formatting options along sequentially selectable horizontal and vertical continuums, according to various embodiments. In various embodiments, text may be originally typed or presented in a default state. The default state may be any font type or font size and may have any of the wide variety of formatting rules applied to it that are discussed herein. In one simple embodiment, text is originally entered by a user in a Times New Roman font with a size 11. No other formatting rules are applied to the text. A user may then swipe with one, two, three, or four fingers to apply a formatting rule to the text by selecting a style or formatting rule from along a continuum of styles or formatting rules.

In the illustrated embodiment, a user may enter text in a default format. By swiping (one, two, three, or four fingers) over the text from left to right, the user may apply a formatting rule "Arial Black" to the underlying text. A subsequent swipe from left to right may apply a formatting rule "Century Gothic." A subsequent swipe from left to right may apply a formatting rule "Tahoma," and a final swipe from left to right may apply a formatting rule "Verdana." Each swipe can be thought of as changing a state of the underlying text to apply a style or formatting rule from along a continuum of formatting rules.

If the text was in the "Century Gothic" state the text would be formatted by applying a "Century Gothic" font to the text. Swiping from left to right would apply a "Tahoma" formatting rule. Swiping from right to left would apply an "Arial Black" formatting rule. A subsequent swipe from right to left would return the text to a default state. Another swipe from right to left would apply a "Georgia" formatting rule. Each subsequent swipe from right to left would apply the formatting rules "Cooper Black" and "Cambria" from along the continuum of formatting rules.

In the illustrated embodiment, the horizontal continuum of formatting rules are merely fonts and only eight total options are illustrated along the horizontal continuum. In other embodiments, any number of options may be available along the horizontal continuum and may include any of formatting options described herein or combinations thereof. In some embodiments, swipes in one direction from the default formatting rule may move along a continuum of serif fonts and swipes in the opposite direction may move along a continuum of sans serif fonts.

Thus, it is contemplated that a horizontal continuum of formatting options can be made accessible to a user via swipes to the left and right. In some embodiments, it may not matter if the swipe is made with one, two, three, four, or five fingers. In each case, the formatting options from along the continuum of formatting options would be applied based on the previous state and the number of received swipes to the left or to the right.

In some embodiments, a single finger touch input may be used to move objects, so formatting options may be selected from along the continuum of formatting options using two, three, four, or five fingers. In some more complex embodiments, multiple horizontal continuums may be accessible at the same time based on the number of figures used in the swipe.

For example, two-finger swipes to the left and right may be used to cycle through a continuum of fonts. Three-finger swipes to the left and right may be used to cycle through a continuum of heading styles. Each heading style may include multiple formatting rules that will be applied to the selected text. For instance, a heading style may apply a font, font size, underlining, bold, italics, indentation, text centering, and/or any combination of formatting rules. Returning to the example, four-finger swipes to the left of a default location may be used to cycle through a continuum of text justification formatting rules (e.g., right, center, left, justified, etc.) while four-finger swipes to the right of the default location may be used to cycle through a continuum of indentation locations for the selected text, sentence, paragraph, etc.

In various embodiments, swipe gestures may be applied or associated with underlying text, the nearest text, text to the left of the swipe location, text to the right of the swipe location, and/or underlying text independent of a cursor location.

Returning to FIG. 16A, a vertical continuum of formatting options may also be accessible through vertical swipes. As previously discussed, in some embodiments a single vertical continuum may be available regardless of the number of fingers used to make the swipe, and in other embodiments the number of fingers use to make the swipe may be used to indicate along which of a plurality of continuums of formatting options a user would like to navigate.

In the illustrated embodiment, vertical swipes from bottom to top may sequentially cycle through bullet options from a bullet point to a checkbox, to a sub-bullet point, or to a dashed line. In some embodiments, the vertical continuum may include number lists and multilevel lists as well. In other embodiments, a first number of fingers (e.g., two) may be used to cycle through the continuum of bullet point formatting options through vertical swipes, a second number of fingers (e.g., three) may be used to cycle through a continuum of numbered lists, and a third number of fingers (e.g., four) may be used to cycle through a continuum of multilevel lists.

As illustrated, a continuum of formatting options may include various styles as well, where each style is associated with one to a plurality of formatting rules. In the illustrated embodiment, a continuum of styles 1, 2, and 3 are available by swiping from top to bottom to cycle through the available options along the vertical continuum.

In some embodiments, fast swipes, long swipes, or swipes in quick succession may navigate along a continuum by more than one state or location. For example, if a user has swiped from left to right twice and from top to bottom three times, the "Century Gothic" font may be applied with a dashed line bullet point. A single long swipe (e.g., more than half the screen, more than three-quarters of the screen, or to the edge of a screen) from top to bottom may skip the sub-bullet point option and apply the bullet point option. In such an embodiment, the long swipe effectively moves the text by two states along the continuum of formatting options. Thus, a long swipe from right to left might remove the "Century Gothic" formatting and return the text to default and another long swipe from right to left might apply a "Cooper Black" formatting rule.

In some embodiments, each continuum may wrap around the edges. Thus, if text is in a "Cambria" state and a user swipes from right to left, the formatting option "Verdana" might be applied. In other embodiments, the formatting options along the continuum may not wrap around the edges.

While FIG. 16A illustrates vertical and horizontal continuums of formatting options, it is appreciated that diagonal continuums are possible as well, as are pinch continuums. For example, each successive pinch inward or pinch outward might cycle through a continuum of font sizes, fonts, and/or other formatting options.

Any of the various formatting options and formatting rules described herein may be placed along any number of continuums accessible through horizontal swipe gestures, vertical swipe gestures, diagonal swipe gestures, or pinch gestures. In some embodiments, distinct continuums may be accessible based on the number of figures used, while in other embodiments the number of figures used may be irrelevant.

Each continuum of formatting rules, formatting options, and/or formatting styles may include any number of options and may or may not be state determinative. For example, in some embodiments, horizontal swipes may navigate along different horizontal continuums of formatting options depending on the current state or position selected along the vertical continuum of formatting options. In other embodiments, the horizontal continuum of formatting options may be the same (e.g., allow a user to cycle through fonts or bullet point styles, or indentation locations) regardless of what formatting options have been applied by moving through the formatting options available along another continuum of formatting options (e.g., vertical, diagonal, or pinch continuums).

FIG. 16B illustrates an alternative embodiment in which the formatting options navigable along each of the continuums is different than that shown in FIG. 16A. Specifically, horizontal swipes from left to right may sequentially cycle through bullet options from a bullet point to a checkbox, to a sub-bullet point, or to a dashed line. In some embodiments, the horizontal continuum may include number lists and multilevel lists as well. In other embodiments, a first number of fingers (e.g., two) may be used to cycle through the continuum of bullet point formatting options through vertical swipes, a second number of fingers (e.g., three) may be used to cycle through a continuum of numbered lists, and a third number of fingers (e.g., four) may be used to cycle through a continuum of multilevel lists.

As illustrated, a continuum of formatting options may include various styles as well, where each style is associated with one to a plurality of formatting rules. In the illustrated embodiment, a continuum of styles 1, 2, and 3 are available by swiping from right to left to cycle through the available options along the horizontal continuum.

In the embodiment illustrated in FIG. 16B, the vertical continuum of formatting rules includes fonts and only eight total options are illustrated along the vertical continuum. In other embodiments, any number of options may be available along the vertical continuum and may include any of formatting options described herein or combinations thereof. In some embodiments, swipes in one direction from the default formatting rule may move along a continuum of serif fonts and swipes in the opposite direction may move along a continuum of sans serif fonts.

Thus, it is contemplated that a vertical continuum of formatting options can be made accessible to a user via vertical swiping gestures. In some embodiments, it may not matter if the swipe is made with one, two, three, four, or five fingers. In each case, the formatting options from along the continuum of formatting options would be applied based on the previous state and the number of received swipes in a specific direction.

Figure 17B:
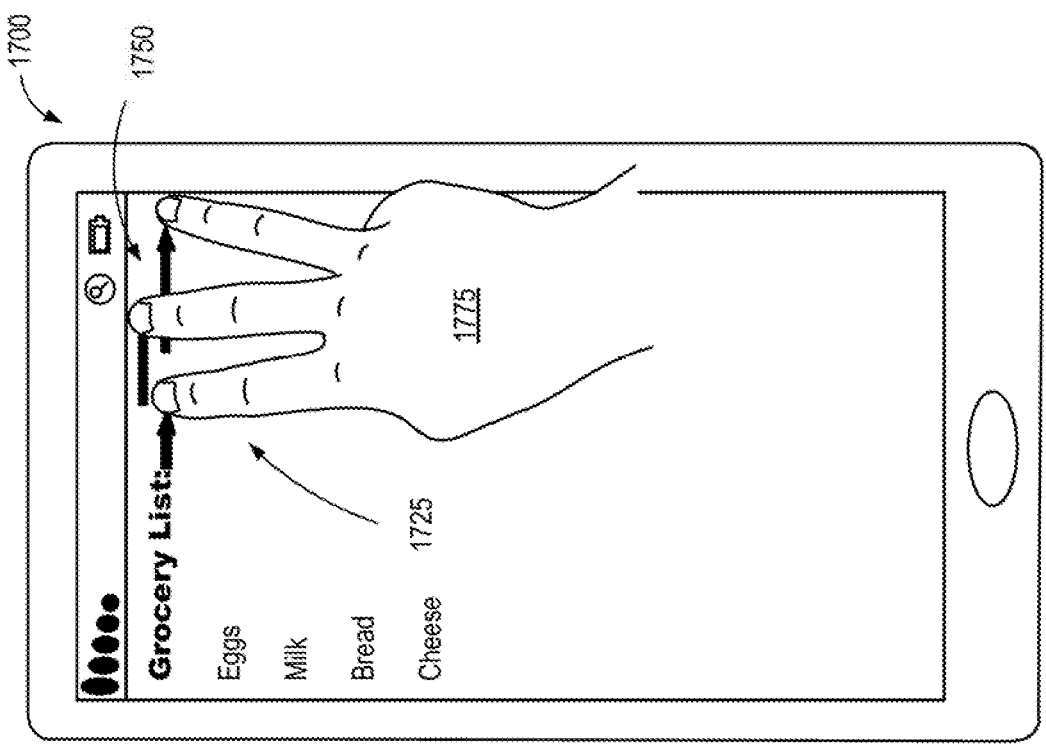
FIG. 17B illustrates a swipe from right to left to revert to a default formatting option along a horizontal continuum of formatting options.
Figure 17A:
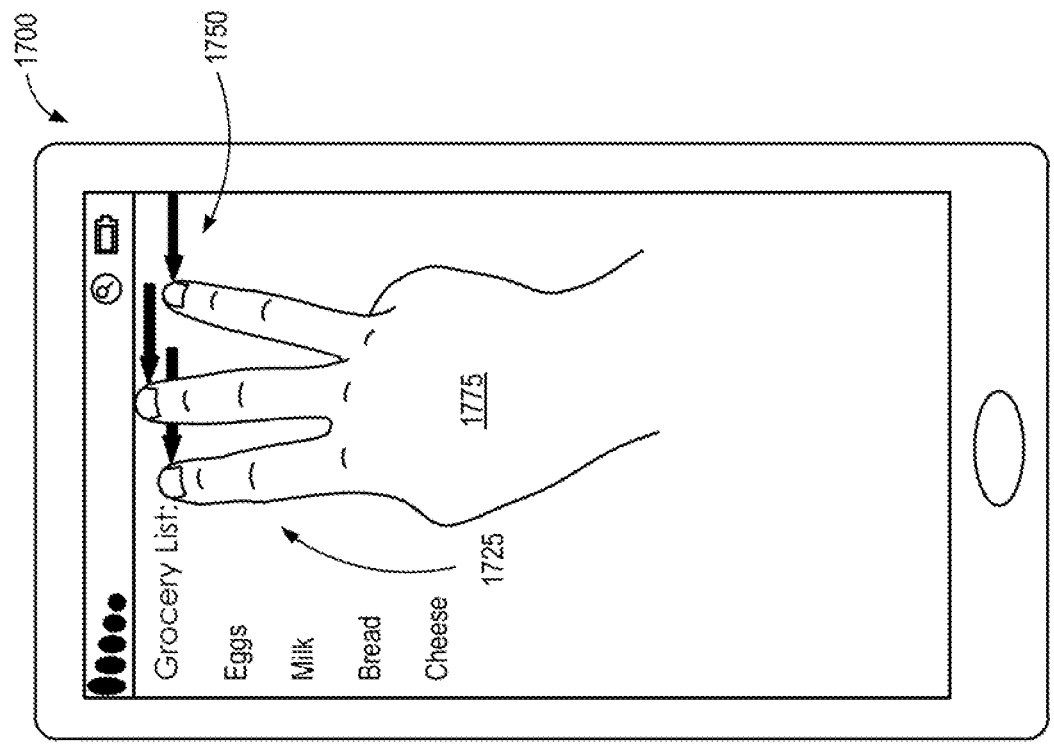
FIG. 17A illustrates a swipe from left to right to select a bold heading formatting option along a horizontal continuum of formatting options.

FIG. 17A illustrates a swipe from left to right 1750 on a touchscreen device 1700 to select a bold heading formatting option along a horizontal continuum of formatting options. FIG. 17B illustrates a swipe from right to left 1750 to revert to a default formatting option along a horizontal continuum of formatting options.

In the illustrated embodiment, the left and right swiping gestures are made with three fingers 1725 substantially aligned along the horizontal swipe. In some embodiments, a two-finger swipe or a four-finger swipe may access the same horizontal continuum of formatting options. In other embodiments, the user 1775 may access distinct continuums of formatting options based on the number of figures used.

Figure 18B:
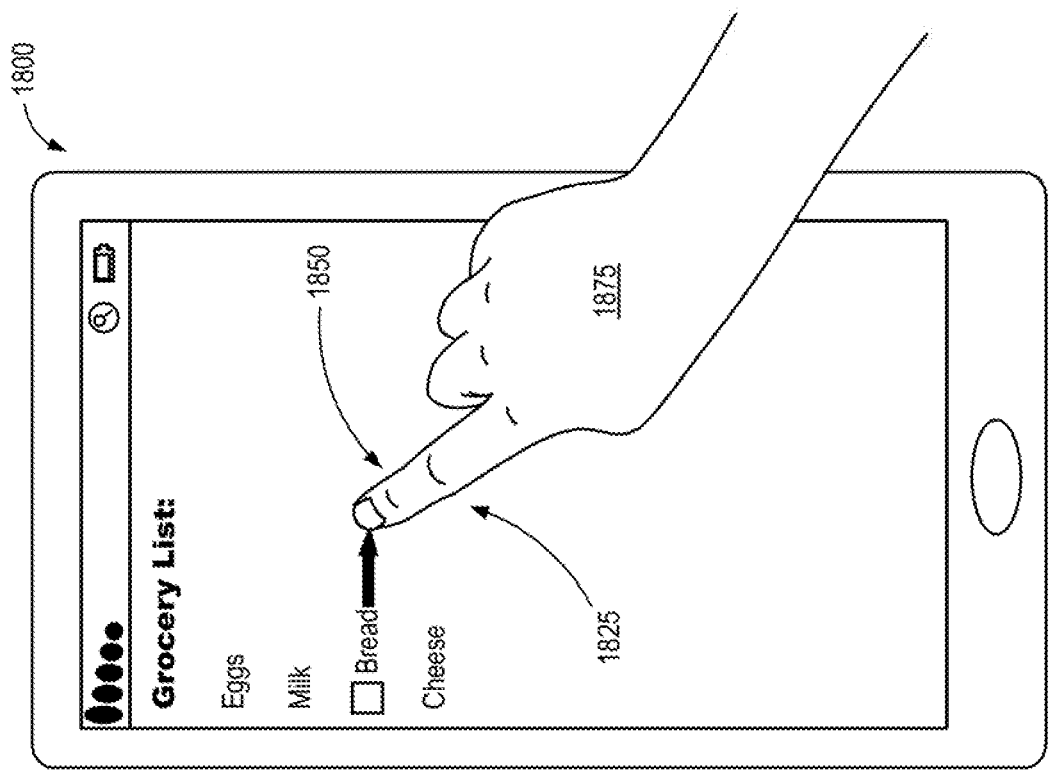
FIG. 18B illustrates a second swipe from left to right to select a checkbox formatting option along a horizontal continuum of formatting options.
Figure 18A:
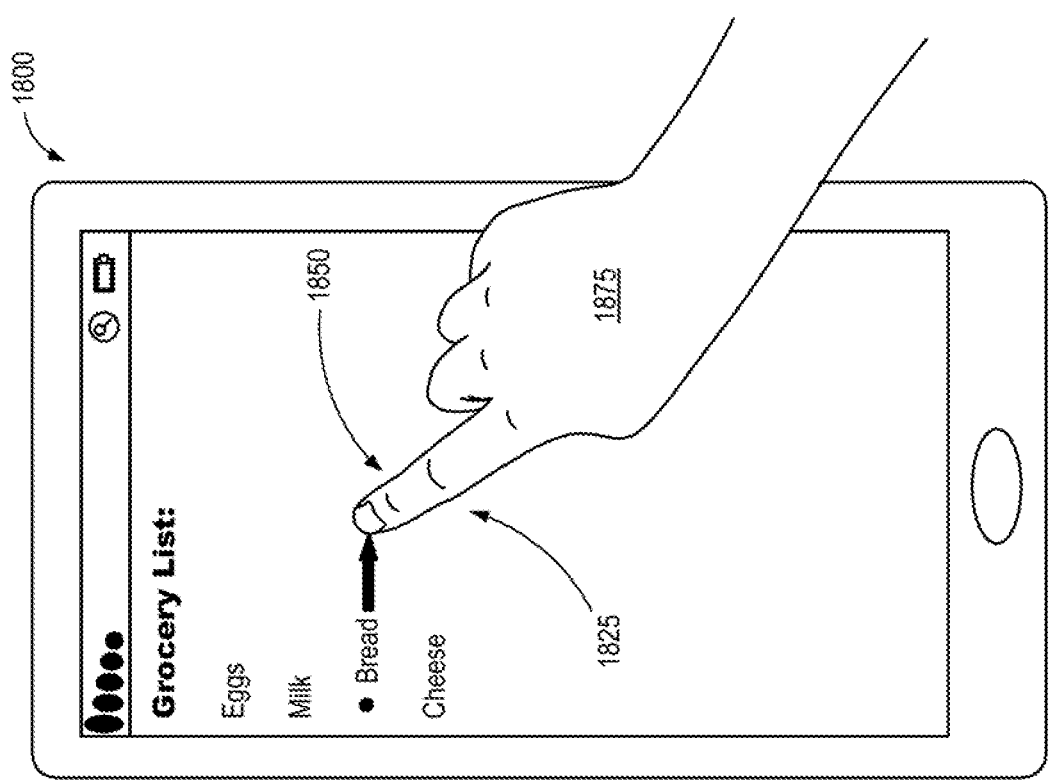
FIG. 18A illustrates a swipe from left to right to select a bullet point formatting option along a horizontal continuum of formatting options.

FIG. 18A illustrates a swipe from left to right 1850 on a touchscreen device 1800 to select a bullet point formatting option along a horizontal continuum of formatting options. In some embodiments, a single-finger swipe may be associated with moving objects or sections of texts. In such embodiments, a user 1875 may be required to use more than one finger 1825 to perform swiping gestures to navigate vertical, horizontal, and/or diagonal continuums of formatting options.

FIG. 18B illustrates a second swipe from left to right 1850 to select a checkbox formatting option in a distinct location or state along a horizontal continuum of formatting options.

Figure 18D:
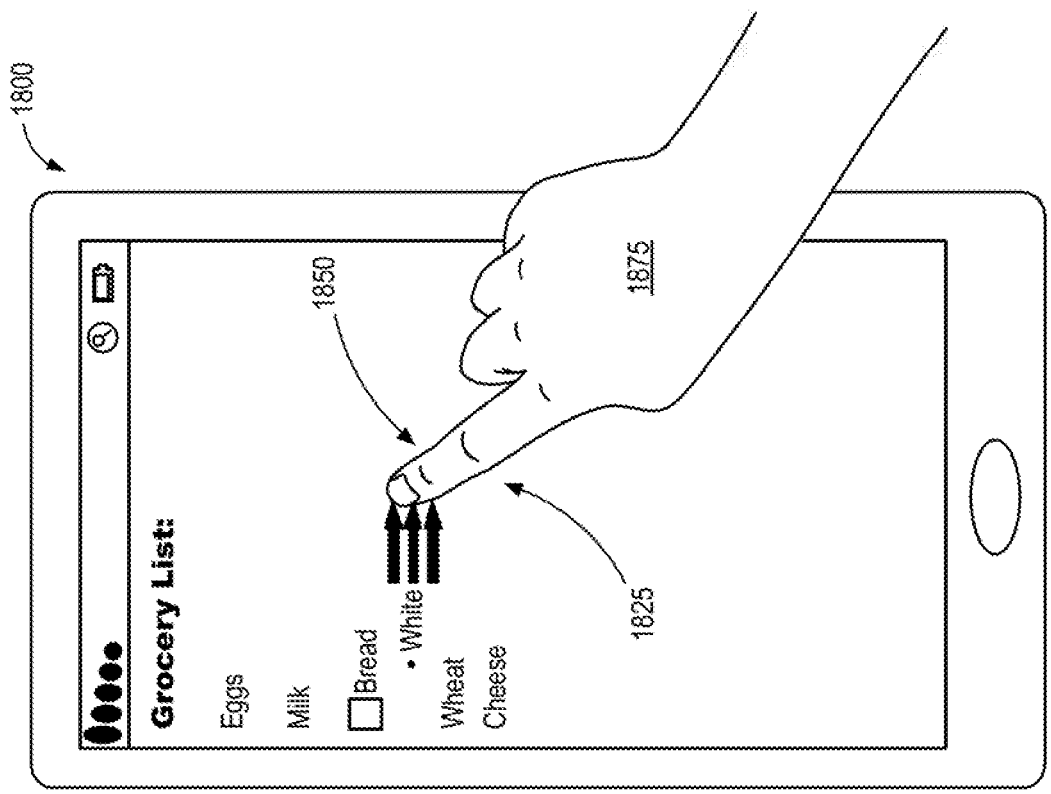
FIG. 18D illustrates three swipes from left to right to select a sub-bullet point formatting option as a third formatting option along a horizontal continuum of formatting options.
Figure 18C:
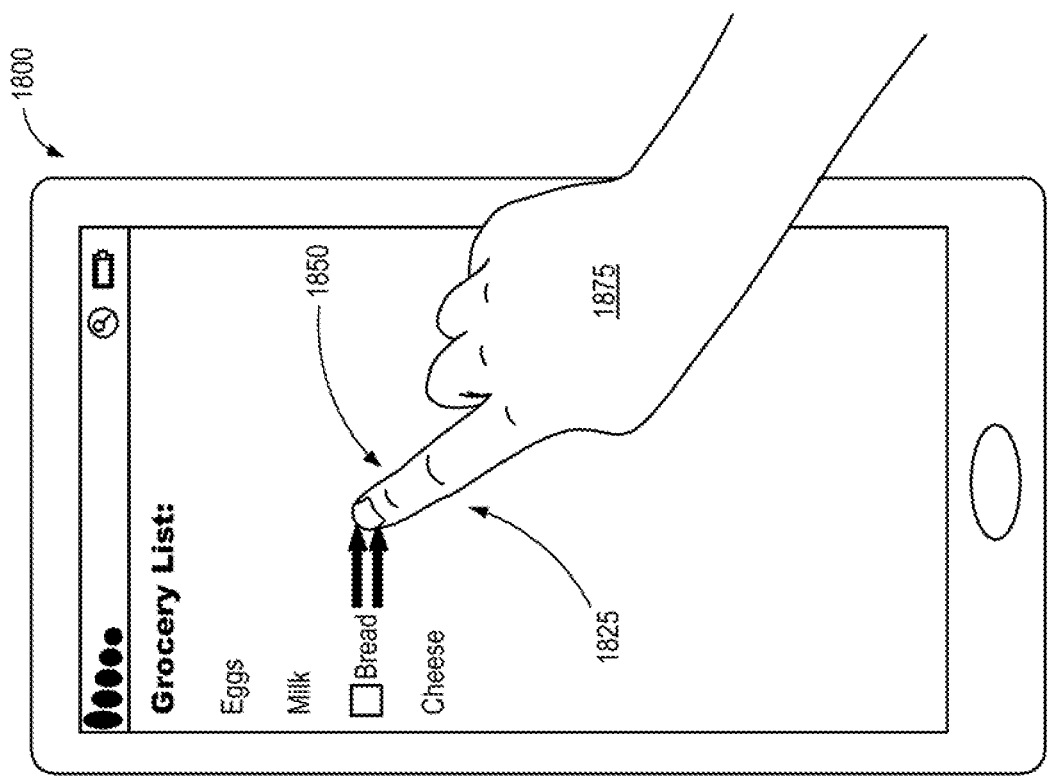
FIG. 18C illustrates that a checkbox formatting option can be selected by swiping from left to right twice to select a second formatting option along a horizontal continuum of formatting options.

FIG. 18C illustrates that a checkbox formatting option can be selected by swiping from left to right twice 1850 to select a second formatting option along a horizontal continuum of formatting options. FIG. 18D illustrates three swipes from left to right 1850 to select a sub-bullet point formatting option as a third formatting option along a horizontal continuum of formatting options.

Figure 18E:
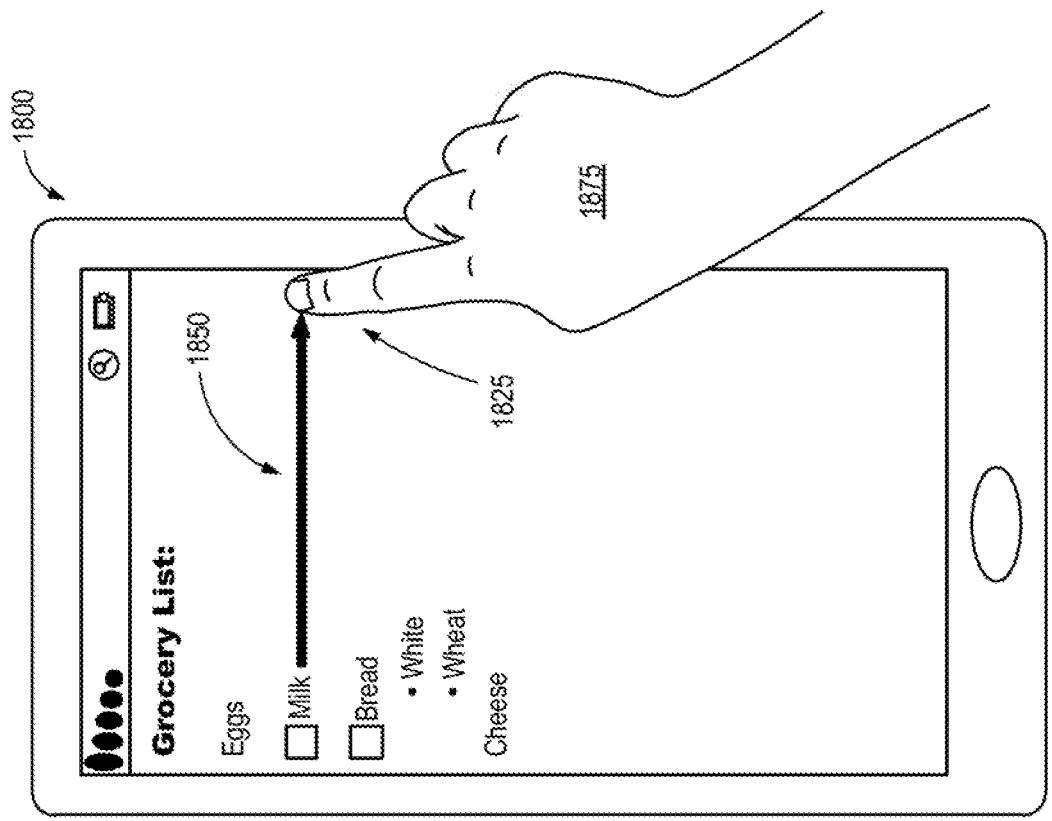
FIG. 18E illustrates another example of three swipes being used to select a sub-bullet point formatting option along a horizontal continuum of formatting options.
Figure 18F:
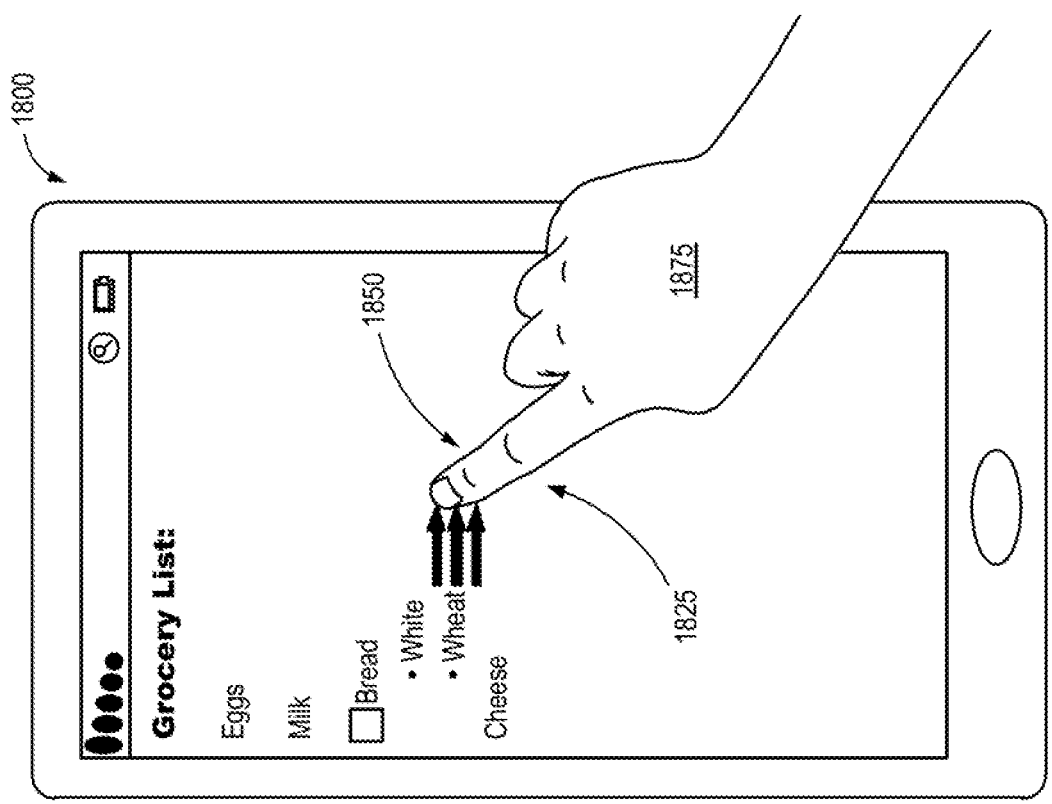
FIG. 18F illustrates a long swipe from left to right to select a second formatting option along a horizontal continuum of formatting options without having to perform two distinct swipes.

FIG. 18E illustrates another example of three swipes 1850 being used to select a sub-bullet point formatting option along a horizontal continuum of formatting options. FIG. 18F illustrates a long swipe from left to right 1850 to select a second formatting option along a horizontal continuum of formatting options without having to perform two distinct swipes, where the first formatting option along the horizontal continuum might have been a normal bullet point. Thus, the text was moved from a default state to the second formatting option through a single swiping gesture (a long swipe). In some embodiments, the length of the swipe may determine how many states or positions along a continuum of formatting options should be skipped.

In an alternative embodiment, a swipe or a long swipe (such as the horizontal swiping gesture illustrated in FIG. 18F) in a particular direction might be used to cycle through a plurality of formatting rules or styles. For example, a swipe (or long swipe) to the right might cycle through a continuum of formatting rules for as long as the gesture is held.

In one embodiment, as a user swipes across a text component a first formatting rule may be applied, as the user continues to swipe in the same direction a second formatting rule may be applied (instead of or in addition to the first formatting rule), as the user continues to swipe in the same direction a third formatting rule may be applied (instead of or in addition to the first and second formatting rules), etc. The number of available formatting rules based on the length of swipe may vary as is practical for a give touch screen, available gesture resolution, and/or desired number of options. The user may stop the swipe between the beginning and end points of the swiping gesture and the formatting options may be cycled through at a cycle rate determined via a configuration setting.

As a specific example, a swipe gesture may follow a continuum of formatting rules based on the length of the swipe and/or the number of successive swipes in a vertical, horizontal, or diagonal direction. A user may, for example, begin a swipe and cycle through an underlining formatting rule, a bold formatting rule, and an italics formatting rule. The user may stop the swipe and hold a finger in place on the italics formatting rule. After a period of time, the previous formatting rules (underlining, bold, and italics) may be cycled through at a predetermined rate. The user may lift the finger (or fingers) from the touchscreen display when a desired formatting rule is applied to the text to make a permanent selection of that specific formatting rule.

Figure 18H:
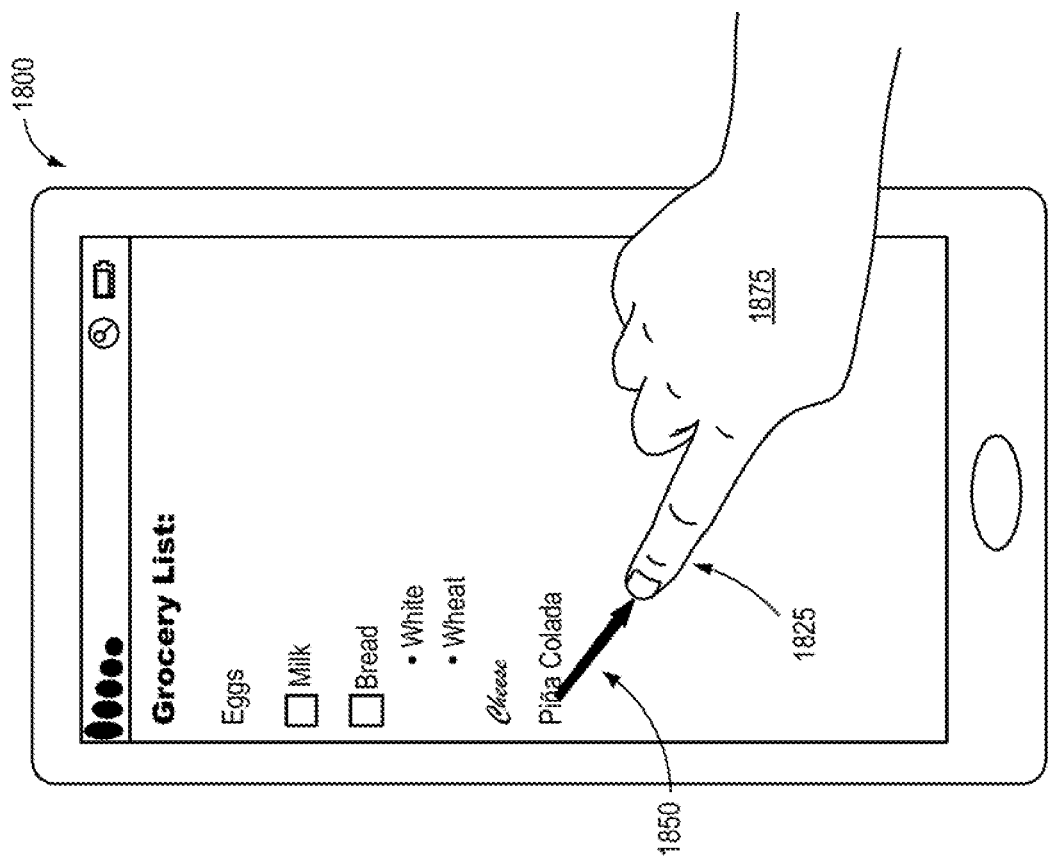
FIG. 18H illustrates a diagonal swipe from top left to bottom right to select a formatting option of a letter along a diagonal continuum of formatting options.
Figure 18G:
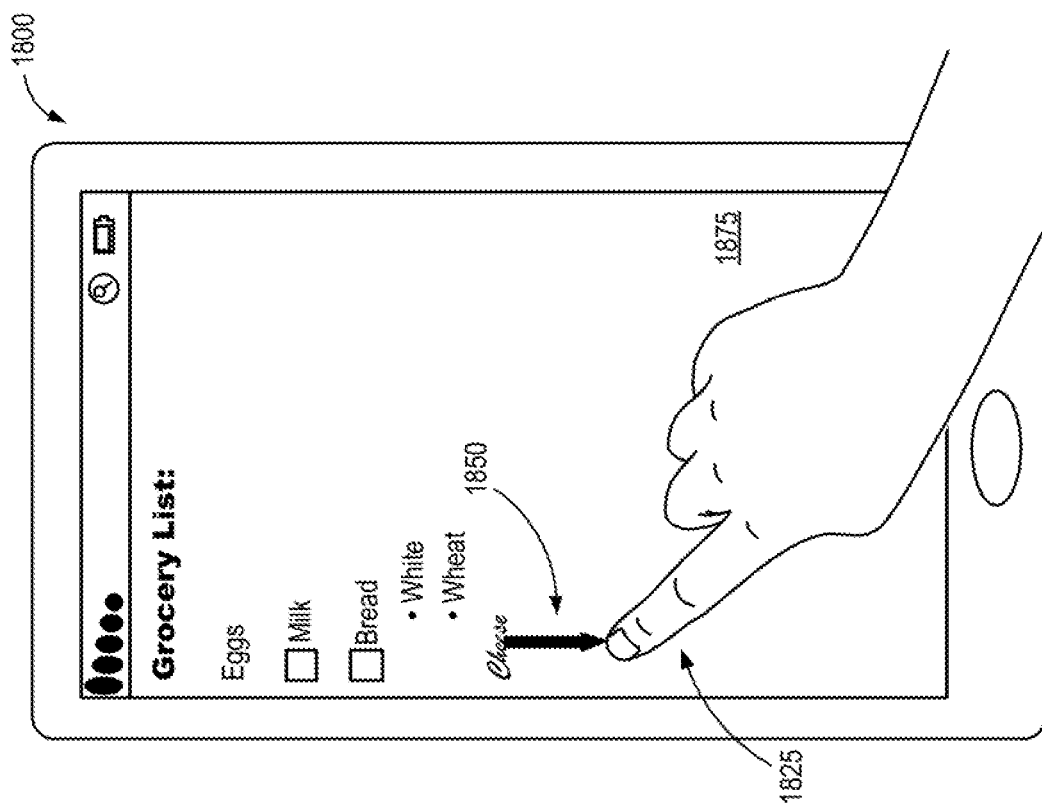
FIG. 18G illustrates a vertical swipe from top to bottom to select a second formatting option along a vertical continuum of formatting options.

FIG. 18G illustrates a vertical swipe 1850 from top to bottom to select a second formatting option along a vertical continuum of formatting options. In the illustrated embodiment, the style of the word "cheese" has been changed to be a new font and a specific font size, and an italics formatting rule has been applied. Thus, with a single swiping gesture, a formatting style defined by multiple formatting rules can be applied.

FIG. 18H illustrates a diagonal swipe 1850 from top left to bottom right over a specific letter. In the illustrated embodiment, the diagonal swipe cycles the letter "n" through various formatting rules. In this case a ~ has been applied over the "n". Subsequent swipes along a diagonal continuum of formatting options might apply various accents. Swipes along a diagonal continuum (perhaps the same continuum or perhaps a perpendicular diagonal continuum) might allow for the selection of superscript and subscript formatting rules.

Figure 18I:
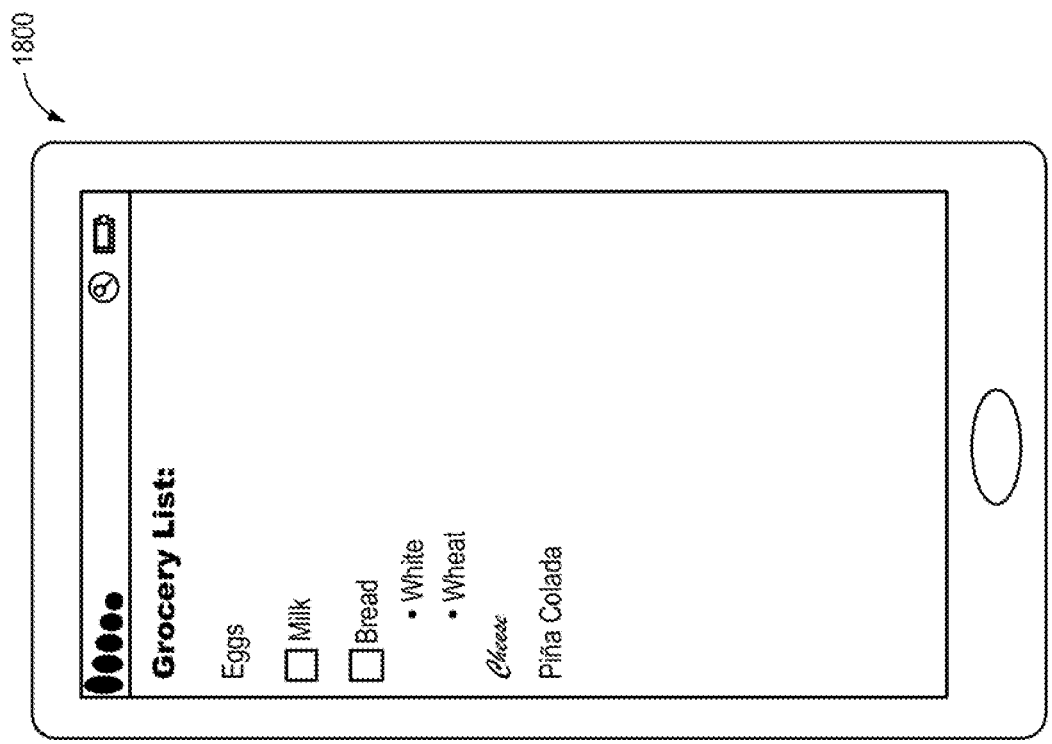
FIG. 18I illustrates a document that has various formatting options applied using nothing but swiping gestures to select formatting options along vertical, horizontal, and diagonal continuums of formatting options.

FIG. 18I illustrates a document that has various formatting options applied using nothing but swiping gestures to select formatting options along vertical, horizontal, and diagonal continuums of formatting options. Some of the continuums of formatting options include selectable formatting styles. Each formatting style might include a plurality of formatting rules. In some embodiments, the continuums and/or formatting styles may be customized by the user. Thus, a user may customize a text editing software platform to provide for easily accessible formatting options that are made available through swipes along one or more continuums.

Reference throughout this specification to "embodiments," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

The claims following this Detailed Description are hereby expressly incorporated into this Detailed Description, with each claim standing on its own as a separate embodiment and every combination of any number of claims standing on its own as another possible embodiment. For example, this disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. Changes may be made to the details of the above-described embodiments without departing from the underlying principles of the invention. The scope of the present application should, therefore, be determined only by the following claims.

The invention claimed is:

1. An electronic input and display device for editing text, comprising:
    an electronic display for displaying text comprising a touchscreen display;
    a gesture input device for receiving at least one of a plurality of gesture input types, the gesture input device comprising a touchscreen digitizer associated with the touchscreen display;
    a processor in communication with the electronic display and the gesture input device; and
    a computer-readable medium comprising instructions that, when executed by the processor, cause the processor to perform operations for formatting text displayed on the electronic display, the operations comprising:
        associating each of the plurality of gesture input types with a set of at least two corresponding text formatting rules of a plurality of sets of text formatting rules, each particular set of text formatting rules being associated with a sequential continuum from a first formatting rule of the particular set of text formatting rules to a last formatting rule of the particular set of text formatting rules;
        displaying text via the electronic display with a current formatting rlue from the plurality of sets of text formatting rules applied to the text;
        receiving a first gesture input via the gesture input device associated with the electronic display, the first gesture input comprising a first gesture input type of the plurality of gesture input types;
        based on the first gesture input, advancing along a first sequential continuum of text formatting rules in a first direction to a first formatting rule of the first sequential continuum of text formatting rules, wherein each consecutive received gesture input comprising the first gesture input type continues advancement along the first sequential continuum of text formatting rules; and
        applying the selected formatting rule of the first sequential continuum of text formatting rules to the text.

2. The input and display device of claim 1, wherein the text comprises one of a phrase, a clause, a sentence, a paragraph, a bulleted list item, a numbered list item, and an ordered list item.

3. The input and display device of claim 1, wherein the plurality of gesture input types includes one or more of a two-finger pinch/spread gesture input, a two-finger tap gesture input, a two-finger twist gesture input, a single-finger diagonal swipe gesture input, a mufti-finger diagonal swipe gesture input, a single-finger horizontal swipe gesture input, a multi-finger horizontal swipe gesture input, and a press and hold gesture input.

4. The input and display device of claim 3, wherein each of the plurality of gesture input types is associated with a subset of the plurality of text formatting rules such that each of the plurality of gesture input types is associated with a different sequential continuum of text formatting rules that includes at least a subset of the plurality of formatting rules.

5. The input and display device of claim 4, wherein the plurality of text formatting rules along the sequential continuum includes one or more of a bold formatting rule, a quotation formatting rule, an italics formatting rule, a strikethrough formatting rule, a bulleted list formatting rule, a numbered list formatting rule, a checkbox formatting rule, a bullet point formatting rule, and a justification formatting rule.

6. The input and display device of claim 1, wherein the next formatting rule is applied to a subset of the displayed text, the subset of displayed text being selected by identifying a portion of text underlying the received first gesture input.

7. The input and display device of claim 1, wherein the next formatting rule is applied to all of the displayed text as a default selection of text in response to no explicit selection being received.

8. A method implemented at a computer system that includes one or more processors, for editing text based on received electronic gesture input, comprising:
    associating each of the plurality of gesture input types with a set of at least two corresponding text formatting rules of a plurality of sets of text formatting rules, each particular set of text formatting rules being associated with a sequential continuum from a first formatting rule of the particular set of text formatting rules to a last formatting rule of the particular set of text formatting rules;

displaying text via an electronic display, comprising a touchscreen display, with a current formatting rule from the plurality of sets of text formatting rules applied to the text, the electronic display including a gesture input device for receiving at least one of a plurality of gesture input types, the gesture input device comprising a touchscreen digitizer associated with the touchscreen display;

receiving a first gesture input via the gesture input device associated with the electronic display, the first gesture input comprising a first gesture input type of the plurality of gesture input types;

based on the first gesture input, advancing along a first sequential continuum of text formatting rules in a first direction to a first formatting rule of the first sequential continuum of text formatting rules, wherein each consecutive received gesture input comprising the first gesture input type provides advancement along the first sequential continuum of text formatting rules; and applying the selected formatting rule of the first sequential continuum of text formatting rules to the text.

9. The method of claim 8, further comprising:

receiving a second gesture input comprising the first gesture input type and being in the first direction via the gesture input device;

associating the second gesture input with advancement along the continuum of formatting rules in the first direction; and applying a third formatting rule from the continuum of formatting rules to the text.

10. The method of claim 9, further comprising:

receiving a third gesture input comprising the first gesture input type and being in a second direction opposite the first direction, via the gesture input device;

associating the third swipe gesture input with navigation along the continuum of formatting rules in the second direction; and reverting to the second formatting rule from the continuum of formatting rules to the text.

11. The method of claim 8, further comprising:

receiving a second gesture input in the first direction via the gesture input device;

identifying the second swipe gesture input as a long swipe gesture input;

associating the second, long swipe gesture input with navigation along the continuum of formatting rules in the first direction by two formatting rule positions; and applying a third formatting rule from the continuum of formatting rules to the text, wherein there is a fourth formatting rule in the continuum of formatting rules between the second formatting rule and the third formatting rule.

12. The method of claim 8, wherein the continuum of formatting rules is vertically aligned, such that navigation of the vertical continuum of formatting rules is accomplished via vertical gesture inputs.

13. The method of claim 8, wherein the continuum of formatting rules is diagonally aligned, such that navigation of the diagonal continuum of formatting rules is accomplished via diagonal gesture inputs.

14. The method of claim 8, wherein the continuum of formatting rules is horizontally aligned, such that navigation of the horizontal continuum of formatting rules is accomplished via horizontal gesture inputs.

15. A non-transitory computer-readable medium comprising instructions that, when executed by a processor, cause the processor to perform operations for formatting text, the operations comprising;

associating each of the plurality of gesture input types with a set of at least two corresponding text formatting rules of a plurality of sets of text formatting rules, each particular set of text formatting rules being associated with a sequential continuum from a first formatting rule of the particular set of text formatting rules to a last formatting rule of the particular set of text formatting rules;

displaying text via an electronic display comprising a touchscreen display with current formatting rule from the plurality of sets of text formatting rules applied to the text, the electronic display including a gesture input device, comprising a touchscreen digitizer associated with the touchscreen display, for receiving at least one of a plurality of gesture input types;

receiving a first gesture input via the gesture input device associated with the electronic display, the first gesture input comprising a first gesture input type of the plurality of gesture input types;

based on the first gesture input, advancing along a first sequential continuum of text formatting rules in a first direction to a first formatting rule of the first sequential continuum of text formatting rules, wherein each consecutive received gesture input comprising the first gesture input type provides advancement along the first sequential continuum of text formatting rules; and applying the selected formatting rule of the first sequential continuum of text formatting rules to the text.

16. The computer-readable medium of claim 15, wherein the operations further comprise:

defining a plurality of continuums of text formatting rules, wherein each of the plurality of continuums includes a subset of the plurality of formatting rules that are sequentially selectable through gesture inputs;

associating each of the plurality of continuums with one of the plurality of gesture input types;

receiving a second gesture input comprising a second, different gesture input type via the gesture input device;

identifying a second continuum of the plurality of continuums of formatting rules that is different from the continuum associated with the first gesture input;

associating the second gesture input with advancement along the second continuum of formatting rules; and applying a third formatting rule to the text, the third formatting rule being associated with the second continuum of formatting rules.

17. The computer-readable medium of claim 16, wherein the operations further comprise:

defining at least one of the plurality of continuums of formatting rules as a horizontal continuum of formatting rules, wherein each of the formatting rules within the horizontal continuum of formatting rules is sequentially selectable through horizontally-oriented gesture inputs.

18. The computer-readable medium of claim 16, wherein the operations further comprise:

defining at least one of the plurality of continuums of formatting rules as a pinch continuum of formatting rules, wherein each of the formatting rules within the pinch continuum of formatting rules is sequentially selectable through collapsing pinch gesture inputs and expanding pinch gesture inputs.

19. The computer-readable medium of claim 15, wherein the operations further comprise:
- receiving a second gesture input via the gesture input device, the second gesture input comprising an expanding pinch gesture input;
- associating the expanding pinch gesture input with navigation along the continuum of formatting rules in a first direction;
- receiving a third gesture input via the gesture input device, the third gesture input comprising a collapsing pinch gesture input; and
- associating the collapsing pinch gesture input with navigation along the continuum of formatting rules in a second direction.

* * * * *